United States Patent [19]
Curtin et al.

[11] Patent Number: 5,672,083
[45] Date of Patent: Sep. 30, 1997

[54] FABRICATION OF FLAT PANEL DEVICE HAVING BACKPLATE THAT INCLUDES CERAMIC LAYER

[75] Inventors: Christopher J. Curtin, Cupertino; Anthony P. Schmid, Solana Beach; Paul A. Lovoi, Saratoga, all of Calif.

[73] Assignee: Candescent Technologies Corporation, San Jose, Calif.

[21] Appl. No.: 483,221

[22] Filed: Jun. 7, 1995

Related U.S. Application Data

[62] Division of Ser. No. 81,913, Jun. 22, 1993.

[51] Int. Cl.$^6$ ............................................. H01J 9/26
[52] U.S. Cl. ................................................... 445/25
[58] Field of Search ................................ 445/24, 25

[56] References Cited

U.S. PATENT DOCUMENTS

| | | |
|---|---|---|
| 3,566,187 | 2/1971 | DuBois, Jr. . |
| 3,753,022 | 8/1973 | Fraser, Jr. . |
| 3,755,704 | 8/1973 | Spindt et al. . |
| 3,855,499 | 12/1974 | Yamada et al. . |
| 3,931,436 | 1/1976 | Kupsky ................................. 445/25 |
| 3,935,499 | 1/1976 | Oess . |
| 3,956,667 | 5/1976 | Veith . |
| 3,962,597 | 6/1976 | Clark et al. .......................... 313/586 |
| 4,018,490 | 4/1977 | Berkenblit et al. .................. 445/25 |
| 4,029,392 | 6/1977 | Moriyama et al. . |
| 4,088,920 | 5/1978 | Siekanowicz et al. . |
| 4,195,892 | 4/1980 | Riley et al. .......................... 445/24 |
| 4,204,721 | 5/1980 | Hubert et al. ........................ 445/25 |
| 4,227,117 | 10/1980 | Watanabe et al. . |
| 4,234,367 | 11/1980 | Herron et al. . |
| 4,281,903 | 8/1981 | Gharadjedaghi . |
| 4,289,538 | 9/1981 | Orso .................................... 252/512 X |
| 4,301,324 | 11/1981 | Kumar et al. . |
| 4,341,980 | 7/1982 | Noguchi et al. . |
| 4,426,773 | 1/1984 | Hargis .................................. 29/832 |

(List continued on next page.)

FOREIGN PATENT DOCUMENTS 0001-661  3/1972  Japan .

OTHER PUBLICATIONS

Brodie et al., "Vacuum Microelectronics," *Advances In Electronics And Electron Physics*, vol. 83, 1992, pp. 1–106.

Brodie, "Advanced Technology: Flat Cold–Cathode CRTs," *Information Display*, vol. 5, No. 1, Jan. 1989, pp. 17–19.

Dow et al., "Ceramic Circuit Technology: The State-of-the Art Today and Tomorrow", *Hybrid Circuit Technology*, Oct. 1994, (4 pages).

Dupont Electronics, "Green Tape Systems", Data Sheet, 1988, 1991 (4 pages).

Goede, "Digital Address Thin Display Tube," Northrop Corp./NTIS, Nov. 1974, pp. 1–134.

Goede, "A Digitally Addressed Flat–Panel CRT," *IEEE Transactions on Electron Devices*, vol. ED–20, No. 11, Nov. 1973, pp. 1052–1061.

(List continued on next page.)

*Primary Examiner*—Kenneth J. Ramsey
*Attorney, Agent, or Firm*—Skjerven, Morrill, MacPherson, Franklin & Friel LLP; Ronald J. Meetin

[57] ABSTRACT

A flat panel display manufacturing process entails forming a laminated structure (90x) by combining a plurality of layers (90 and 90a–90e), including a ceramic layer (90). The laminated structure is fired to convert the layers into an integrated backplate structure, at least part of which constitutes a backplate (93b, 16, or 201). A flat panel device that contains the backplate, a faceplate (91a, 12, or 202) connected to the baseplate to form a sealed enclosure (203), a mechanism (22 and 93) for producing light, and a mechanism (20 or 204) for controlling the light-producing mechanism is then fabricated. The ceramic may be of the zero shrinkage tolerance type. Glazing material can be formed over the backplate. Cooling channels (1101a) can be incorporated in the backplate. A field emission cathode (243) can be formed in openings (241a) in the backplate.

31 Claims, 20 Drawing Sheets

U.S. PATENT DOCUMENTS

| | | |
|---|---|---|
| 4,435,672 | 3/1984 | Heynisch . |
| 4,449,949 | 5/1984 | Eto et al. .................................. 445/24 |
| 4,451,759 | 5/1984 | Heynisch . |
| 4,564,790 | 1/1986 | Veith . |
| 4,613,399 | 9/1986 | Kobale et al. ..................... 445/25 X |
| 4,677,259 | 6/1987 | Abe . |
| 4,719,388 | 1/1988 | Oess . |
| 4,820,661 | 4/1989 | Nair . |
| 4,857,799 | 8/1989 | Spindt et al. . |
| 4,867,935 | 9/1989 | Morrison, Jr. . |
| 4,884,010 | 11/1989 | Biberian . |
| 4,887,000 | 12/1989 | Yamazaki et al. . |
| 4,900,981 | 2/1990 | Yamazaki et al. . |
| 4,908,539 | 3/1990 | Meyer . |
| 4,940,916 | 7/1990 | Borel et al. . |
| 4,948,759 | 8/1990 | Nair . |
| 4,964,946 | 10/1990 | Gray et al. . |
| 5,053,673 | 10/1991 | Tomii et al. . |
| 5,057,047 | 10/1991 | Greene et al. . |
| 5,063,323 | 11/1991 | Longo et al. . |
| 5,070,282 | 12/1991 | Epsztein . |
| 5,132,648 | 7/1992 | Trinh et al. . |
| 5,155,410 | 10/1992 | Wakasano et al. . |
| 5,424,605 | 6/1995 | Lovoi ..................................... 313/422 |

OTHER PUBLICATIONS

Hargis, "Ceramic Multichip Modules (MCM–C)", Inside ISHM, Mar./Apr. 1993, pp. 15–18.

Jaitly et al., "In–situ Insulator Surface Charge Measurements in Dielectric Bridged Vacuum Gaps Using an Electrostatic Probe," *IEEE Transactions on Electrical Insulation*, vol. 23, No. 2, Apr. 1988, pp. 261–273.

Knickerbocker, "Overview of the Glass–Ceramic/Copper Substrate—A High–Performance Multilayer Package for the 1990s", *American Ceramic Society Bulletin*, vol. 71, No. 9, Sep. 1992, pp. 1393–1401.

Meyer, "6" Diagonal Microtips Fluorescent Display for T.V. Applications," *EuroDisplay Digest*, Sep. 1990, (4 pages).

Nishihara et al., "32.5: Fully Integrated Poly–Si TFT CMOS Drivers for Self–Scanned Light Valve", *SID 92 Digest*, 1992, pp. 609–612.

Reed, "Heat Treatment Studies on High Alumina Ceramics," from Slater, *Advances in Electron Tube Techniques*, The MacMillan Company, New York, 1963, pp. 15–29.

Takahashi et al., "Back Modulation Type Flat CRT," Japan Display '92, 1992, pp. 377–380.

Tannas, Jr., "Flat–Panel Displays and CRTs," 1985, pp. 218–219, 231–232, 360, 400, 403.

Terao et al., "37.4: Fabrication of Fine Barrier Ribs for Color Plasma Display Panels by Sandblasting", *SID 92 Digest*, 1992, pp. 724–727.

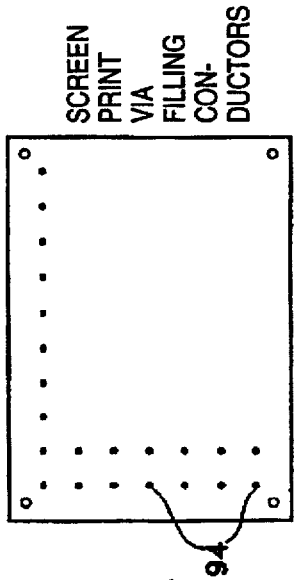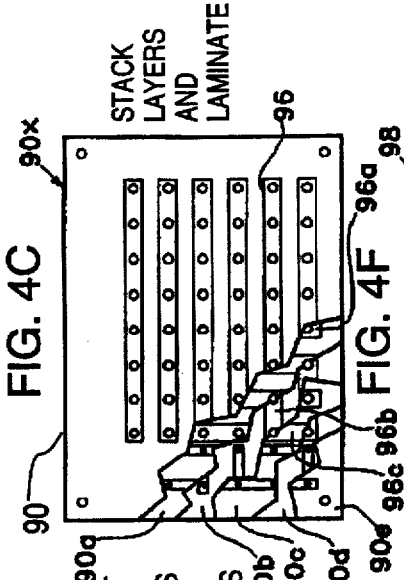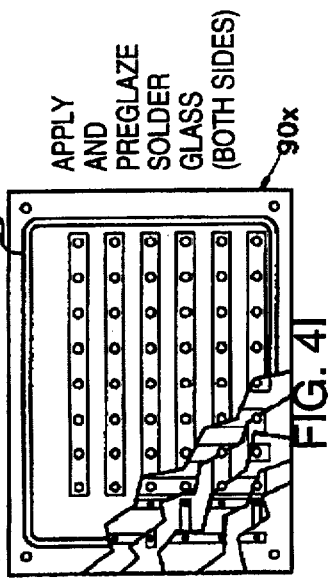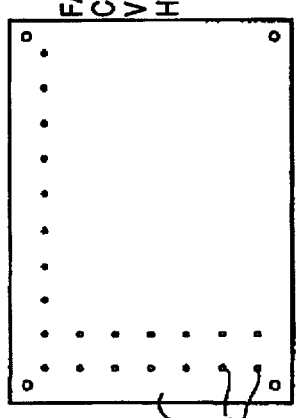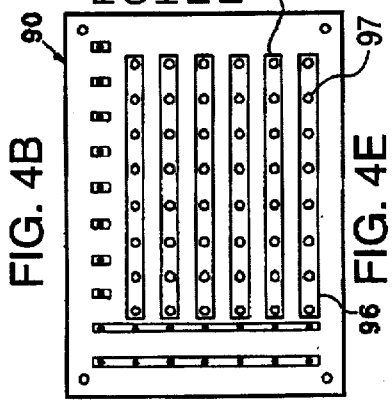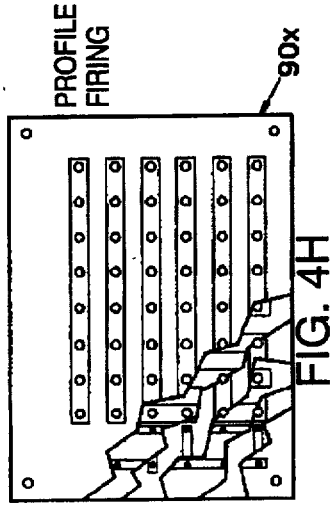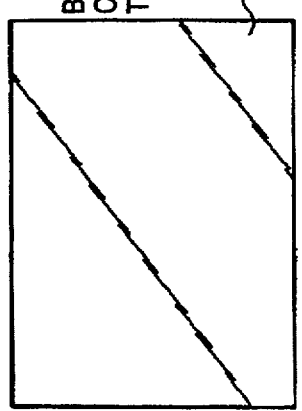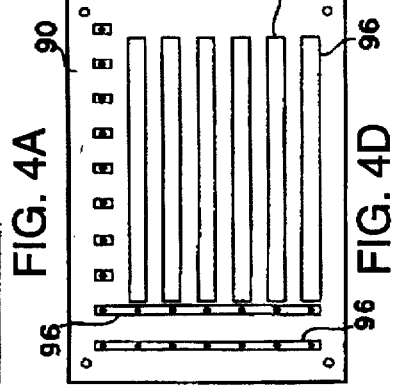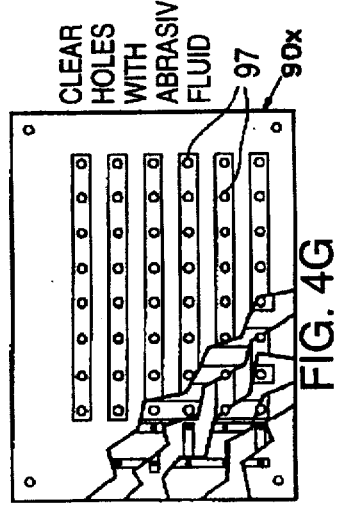

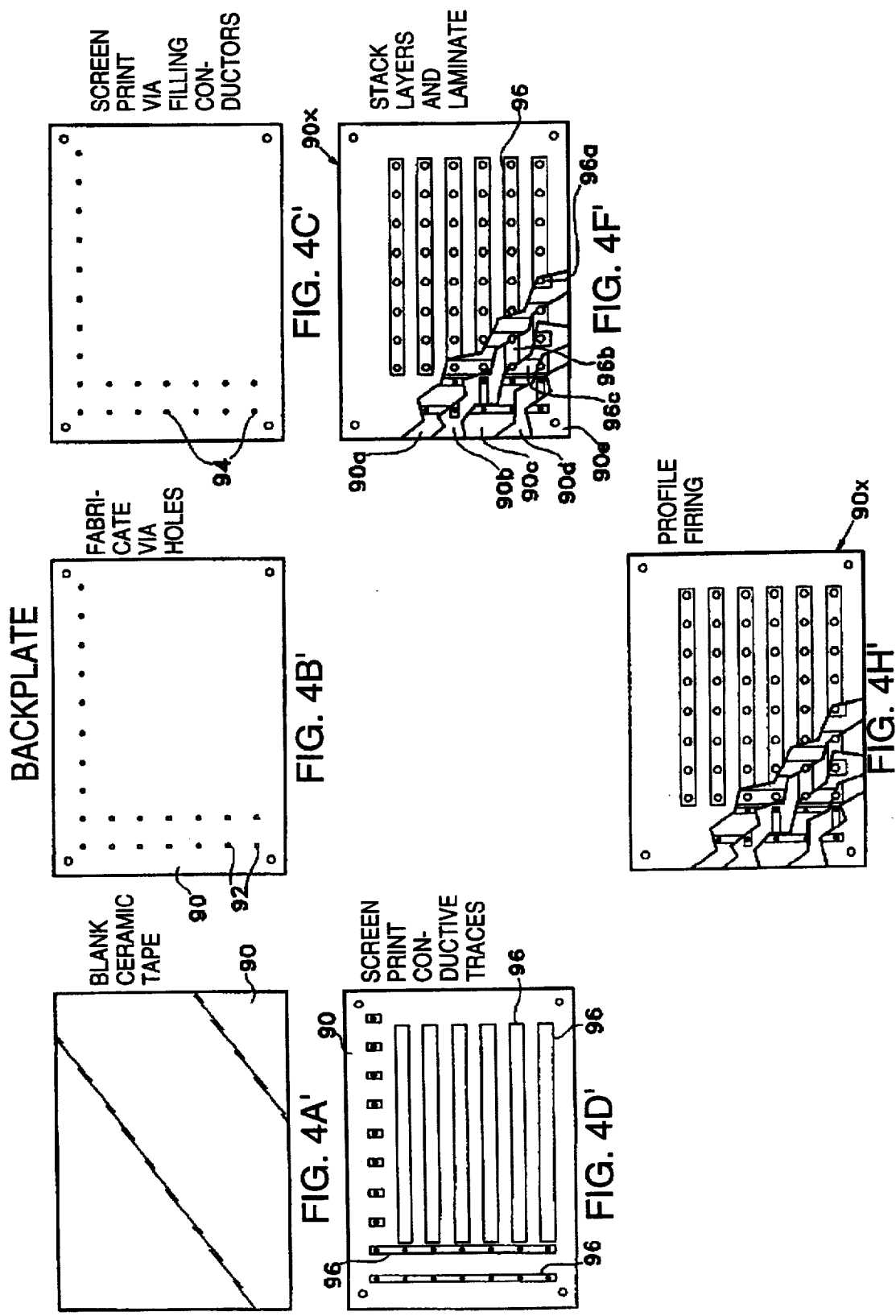

CATHODE
FIG. 4L
ATTACH CATHODE FRAME TO BACKPLATE
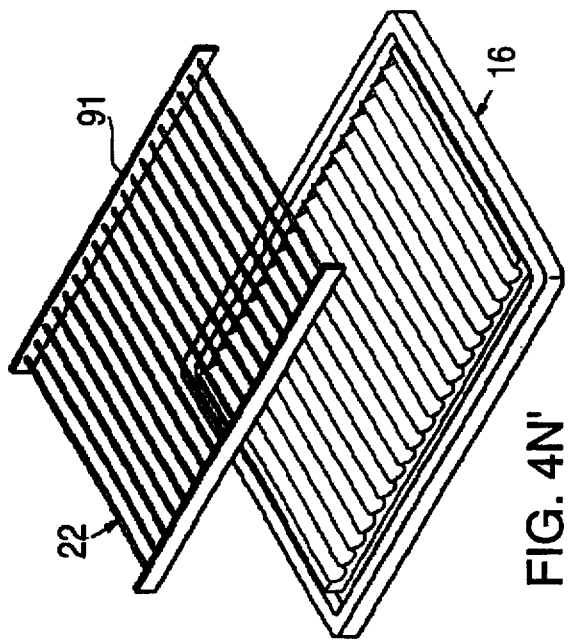
FIG. 4N'
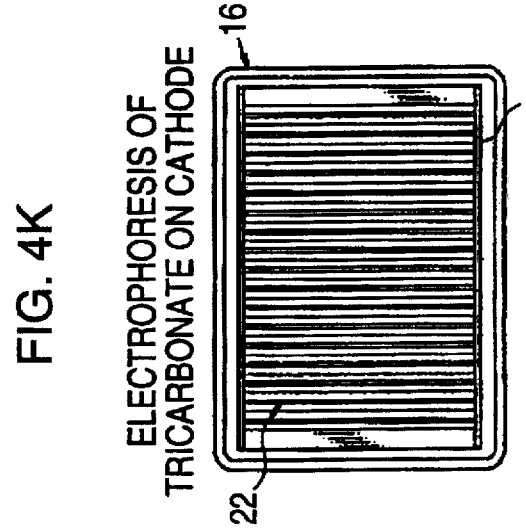
FIG. 4K
APPLY AND PREGLAZE SOLDER GLASS
FIG. 4N
ELECTROPHORESIS OF TRICARBONATE ON CATHODE
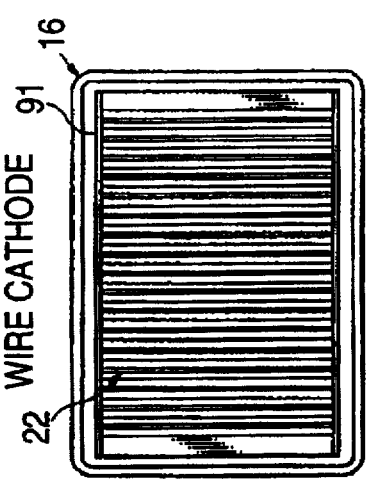
FIG. 4M
WIRE CATHODE

FACEPLATE
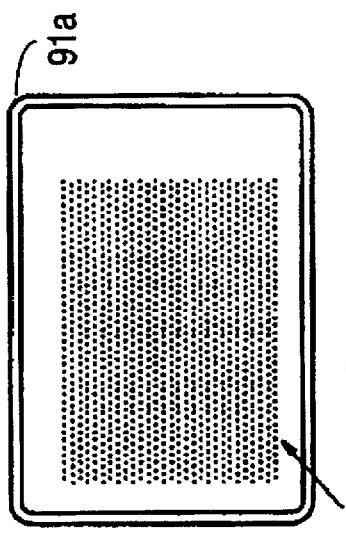
FIG. 4R APPLY PHOSPHORS AND LACQUER
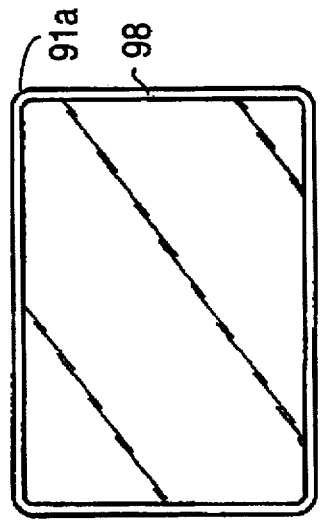
FIG. 4Q PREGLAZE SOLDER GLASS
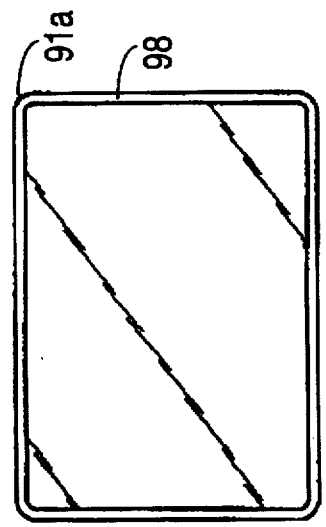
FIG. 4P APPLY SOLDER GLASS
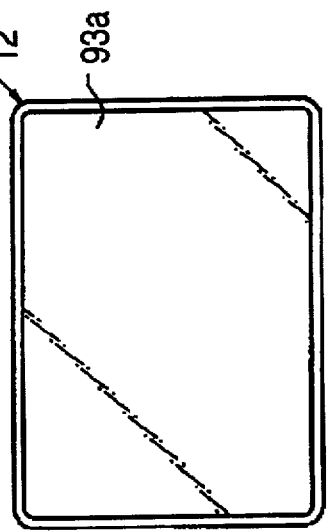
FIG. 4S ALUMINIZE SCREEN

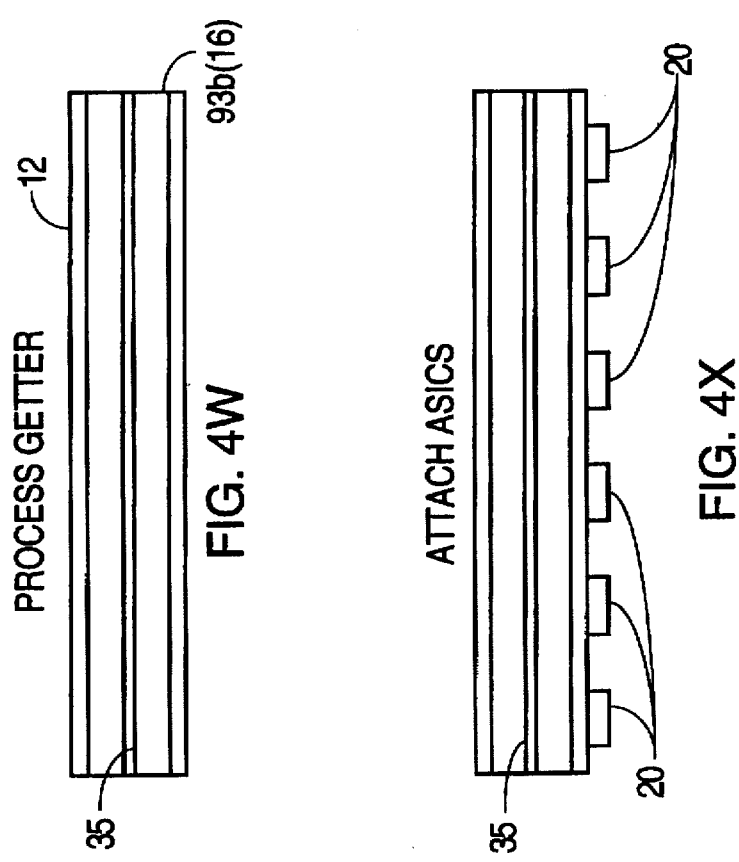
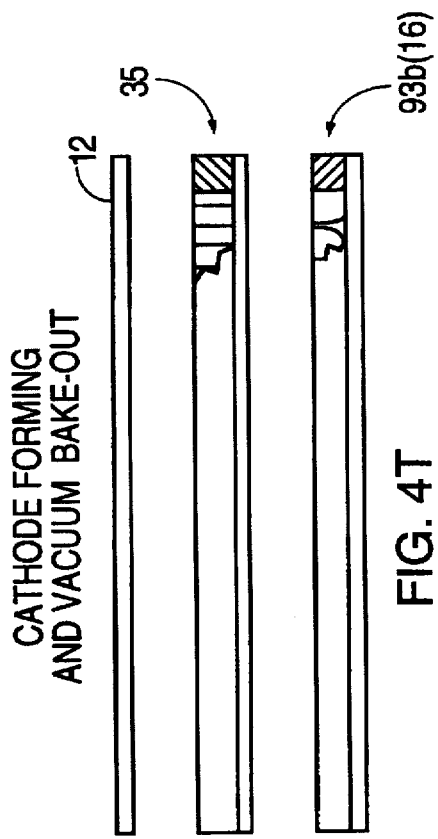
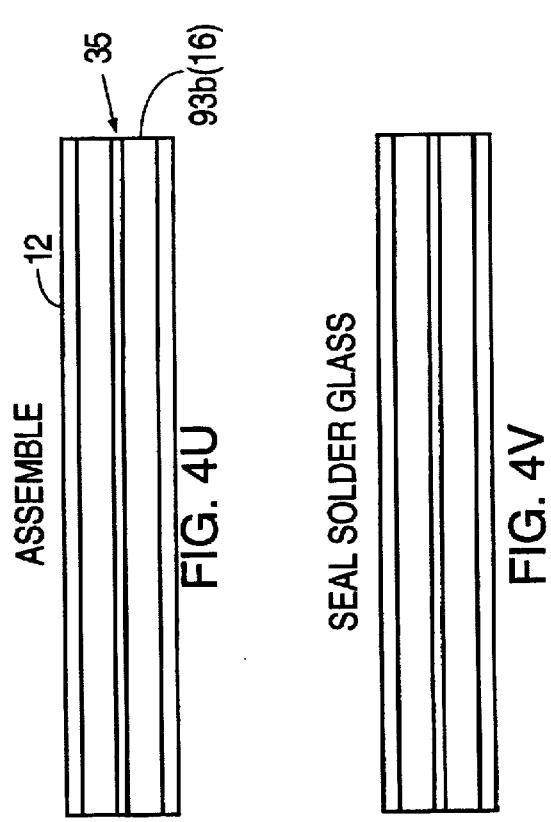

FABRICATION OF FLAT PANEL DEVICE HAVING BACKPLATE THAT INCLUDES CERAMIC LAYER

CROSS-REFERENCE TO RELATED APPLICATIONS

This application is a division of U.S. patent application Ser. No. 08/081,913, filed Jun. 22, 1993, and is related to the following commonly owned, U.S. patent applications: the U.S. patent application Ser. No. 07/867,044, entitled "Self Supporting Flat Video Display," by Paul A. Lovoi, filed Apr. 10, 1992, now U.S. Pat. No. 5,424,605, the U.S. patent application Ser. No. 08/012,297, entitled "Grid Addressed Field Emission Cathode", by Robert M. Duboc, Jr. and Paul A. Lovoi, filed Feb. 1, 1993, now U.S. Pat. No. 5,541,473, and the U.S. patent application Ser. No. 08/012,542, entitled "Internal Support Structure For Flat Panel Device" by Theodore S. Fahlen, Robert M. Duboc, Jr. and Paul A. Lovoi, filed Feb. 1, 1993, now allowed, each of which is hereby incorporated by reference.

BACKGROUND OF THE INVENTION

1. Field of the Invention

This invention relates to the use of a ceramic substrate as the backplate of a flat panel device such as a flat panel display. More particularly, this invention relates to the use of a co-fired ceramic substrate—and, most particularly, a multilayer co-fired ceramic substrate—as the backplate of a flat panel device.

2. Related Art

Numerous attempts have been made in recent years to construct a flat cathode ray tube (CRT) display to replace the conventional CRT display in order to provide a lighter and less bulky display. In addition to flat CRT displays, other flat panel displays (herein, a flat panel display is a display in which the thickness of the display, measured in a direction substantially perpendicular to the viewing surface of the display, is small compared to the thickness of a typical CRT display), such as thin film electroluminescent (TFEL) displays, plasma displays (PDP), vacuum fluorescent displays (VFD), and liquid crystal displays (LCD), have also been developed.

FIG. 1 is a simplified cross-sectional view of prior art flat panel display 100. Faceplate 102, backplate 101 and side walls 105 form sealed enclosure 103. In some flat panel displays, the sealed enclosure is held at vacuum pressure, e.g., in flat CRT displays, approximately $1 \times 10^{-7}$ torr.

Within enclosure 103, structure for producing light (not shown) causes light to be emitted from faceplate 102. For instance, in a flat CRT display, the interior surface of faceplate 102 is coated with phosphor or phosphor patterns (not shown) which define the active region of the display. Cathodes (either field emission or thermionic) located adjacent backplate 101 are excited to release electrons which are accelerated toward the phosphor on faceplate 102. When the phosphor is struck by electrons, the phosphor emits light which is seen by a viewer at the exterior surface ("viewing surface") of faceplate 102.

In many displays, the active region of the faceplate is divided into defined regions which represent the smallest individual elements (pixels) of the active region. In some flat panel displays, known as matrix addressed flat panel displays, the light producing structure is controlled as a function of time so that light is produced at each pixel only at desired times. The light producing structure in such flat panel displays is divided into a matrix of "display elements" (not shown). Each of the display elements is controlled to cause light emission (addressed) at a corresponding pixel by driver circuitry external to the display.

In flat panel display 100, backplate 101 extends beyond side walls 105 around some or all of the periphery of display 100. Integrated circuit chips 104 on which driver circuitry is formed are attached to surface 101a of backplate 101 outside of enclosure 103 adjacent side walls 105. Integrated circuit chips 104 are electrically attached to electrically conductive traces or bonding locations (not shown) on surface 101a by, for example, solder balls 109. Alternatively, integrated circuit chips 104 can be electrically connected to the traces or bonding locations by wirebonding, flip chip mounting, controlled collapse chip connection (C4), conductive epoxy, or other mounting technique.

Electrically conductive traces (not shown) formed on surface 101a extend into enclosure 103 to contact each of the display elements. The driver circuitry is thus electrically connected to the display elements through the electrical connection of integrated circuit chips 104 to surface 101a, and the traces formed on surface 101a, so that the driver circuitry can control each of the display elements to cause pixels to light up at appropriate times.

Since integrated circuit chips 104 are attached to surface 101a of backplate 101 around the periphery of display 100, the width and length of display 100 are larger than dictated by the width and length of the active region and the thickness of side walls 105. In other words, the extra width and length of display 100 is "dead area," i.e., area that is not part of the viewing screen, that makes display 100 larger than is ideally desired. As discussed further below, this location of integrated circuit chips 104 is mandated by the materials typically used for backplate 101.

Typically, the backplate of flat panel displays is a glass substrate. Glass is relatively inexpensive, relatively flat, and dimensionally stable, i.e., the x and y dimensions (width and length) of the glass backplate do not change irreversibly as a result of changes in temperature over the normal range of processing temperatures for flat panel display manufacture.

In order to eliminate the dead area associated with the portion of backplate 101 on which integrated circuit chips 104 are mounted, it is desirable to mount integrated circuit chips in another location on display 100 such as, for instance, exterior surface 101b (back surface) of backplate 101. In order to mount integrated circuit chips 104 on back surface 101b, it is necessary to electrically connect the front and back surfaces 101a and 101b. It is expensive and difficult tow rap leads over the edge of the glass backplate. Electrically conductive vias could be put through backplate 101 so that the driver circuitry can be used to address the display elements within enclosure 103. Unfortunately, it is expensive and difficult to form the high aspect ratio holes, i.e., a hole having a large depth relative to the hole diameter, in glass substrates that are necessary to produce electrically conductive vias. Consequently, in prior art flat panel displays such as display 100 of FIG. 1, integrated circuit chips 104 have been attached to surface 101a of backplate 101 (as shown in FIG. 1), rather than to back surface 101b, unnecessarily increasing the overall size of display 100, and, for some displays such as display 100, complicating the seal structure where side walls 105 meet backplate 101.

To overcome the problems with forming vias in glass, ceramic has been tried as a backplate material. Holes are drilled through a fired ceramic substrate and plugged with various metal/glass frit compounds suitable for via-filling in ceramics. The ceramic substrate with filled via holes is then fired. However, the metal/glass frit compounds tend to shrink when the compound is fired. At best, a moat is formed between the metal/glass plug and the ceramic. At worst, the metal/glass plug separates from the ceramic and falls out of the hole. To overcome these problems, it may be possible to perform more than one screening and firing to adequately fill the via holes, making production of the backplate expensive.

There is another problem with the use of a ceramic substrate for the display backplate. In any display, the mechanical placement of the display elements, e.g., field emitters, on the backplate must be precise and predictable. Thus, it must be possible to locate features on the ceramic substrate precisely. For many flat panel displays, it is necessary that the features be located within 1 mil of the design location. However, distortion of ceramic substrates (arising from, for example, exposure of the ceramic to screening and via fill solvents, drying operations and lamination operations) causes feature locations to vary from the design location. Typical ceramic substrates are made such that features are located within 1% of the design location (herein, feature location is assumed to be measured from the center of the substrate). The lowest feature tolerance that has been achieved with a production ceramic substrate is 0.1%. Even with this lowest tolerance, for a display having an active region with a 10 inch diagonal, features near the corners of the backplate may be displaced by as much as 5 mils, an unacceptably high error.

The use of glass substrates for flat panel display backplates has other significant drawbacks. Glass is brittle and difficult to handle in the large thin sheets required for backplates. Further, if backplates are formed of multiple layers; it would be difficult to laminate multiple layers of glass together without forming undesirable voids, bubbles, virtual leaks and other similar defects.

Additionally, glasses that are typically used for backplates can only tolerate moderately elevated processing temperatures, e.g., the temperature limit for processing glasses such as soda lime and borosilicate is approximately 500° C. High temperature processing (i.e., greater than 900° C.) is desirable to provide a number of beneficial features such as annealing of polysilicon circuitry to form driver circuitry on the display backplate, and the conversion of amorphous phosphor into crystalline phosphor for use on an EL display backplate.

An alternative material that has been used for the backplate of a flat panel display is quartz. Although quartz can be processed at higher temperatures than glass, i.e., temperatures up to approximately 1000° C., quartz is prohibitively high in cost.

SUMMARY OF THE INVENTION

According to the invention, a flat panel device includes a faceplate, a backplate made of a co-fired ceramic substrate and attached to the faceplate to form a sealed enclosure, and structure for producing or modulating light. The faceplate includes an active region (region of the faceplate from which light is visible) which is divided into pixels (defined regions of the active region which represent the smallest individually controlled portions of the active region). The light producing or modulating structure includes a matrix of "display elements" or a plurality of "light generating elements." Driver circuitry is formed on or attached to a surface of the backplate. For example, the driver circuitry can be thin film transistors (TFTs) formed on the interior surface of the backplate, or the driver circuitry can be formed on one or more integrated circuit chips (driver chips) that are attached to a surface of the backplate. The driver circuitry is connected to the display elements or light generating elements by electrically conductive material formed entirely or partially through, within or on the ceramic substrate, and which may include a combination of electrically conductive traces and vias. Each of the display elements or light generating elements is controlled by the driver circuitry to cause light emission at a corresponding pixel or pixels of the faceplate active region (i.e., addressed).

The driver circuitry can be formed on or attached to an entire surface of the backplate, rather than only a peripheral portion of a surface of the backplate (edge-mounted drivers) as in previous flat panel devices. Thus, the flat panel device according to the invention can be made smaller (for an active region of a given size) or can be made with a larger active region (for a given overall device size). Further, less ceramic is used in making a flat panel device according to the invention, since the backplate does not extend as far as in previous flat panel devices, thus enabling the flat panel device to be constructed at less cost.

The ability to mount electronic components (such as driver chips) on the exterior surface of the backplate provides other benefits. The edge-mounted driver chips of previous flat panel displays were limited in size because of the desire to minimize the peripheral mounting area (and, thus, the overall size) of the display. In a flat panel device according to the invention, larger driver chips having a higher pin count can be used, thus reducing the required number of driver chips that must be mounted to the backplate, thereby increasing the speed with which the device can be produced and reducing manufacturing costs.

In previous flat panel displays, edge-mounted driver chips were electrically connected to circuitry on the display by wirebonding the chips to the display. In the flat panel device according to the invention, the driver chips can be mounted on the exterior surface of the backplate using existing packaging techniques such as IBM's is controlled collapse chip connection (C4) process which are easier and cheaper to implement than wirebonding.

In another embodiment of the invention, ancillary integrated circuit chips that perform functions other than controlling the display elements or light generating structure of the device, such as chips on which microprocessor, peripheral (e.g., RAM, clocking, modem) or interface circuitry is formed, are mounted on the exterior surface of the backplate, thereby augmenting the device capabilities without increasing the size of the device.

Flat panel devices according to the invention that include both driver and ancillary integrated circuit chips, as well as display elements or light generating elements, may have excessive heat build-up. A ceramic substrate according to the invention that has multiple layers can be formed with channels within the substrate that allow for passage of a fluid (e.g., air) through the backplate to aid in the removal of heat from the flat panel device.

In some previous flat panel displays, integrated circuit chips were mounted to a printed circuit board which was, in turn, connected to the backplate of the display. In the flat panel device according to the invention, integrated circuit chips can be surface mounted directly to the backplate, thus eliminating the printed circuit board of some previous flat panel displays, and enabling the overall display thickness and the manufacturing cost to be reduced as compared to previous flat panel displays.

Backplates made of ceramic, as in the flat panel device according to the invention, are stronger than backplates made of glass, such as float glass, as has been done in previous flat panel displays. As flat panel devices increase in size, strength becomes even more important, making the additional strength provided by ceramic backplates even more of an advantage. Further, the increased strength provided by ceramic substrates enables ceramic backplates to be made thinner and lighter than glass backplates, resulting in a thinner and lighter flat panel device.

In addition to increased strength, ceramic does not suffer from micro-crack propagation the way glass does, making the backplate more resistant to failure due to crack propagation.

A co-fired ceramic substrate according to the invention enables low cost production and good control of substrate features for both small (i.e., displays having an active region diagonal of smaller than 10 inches) and large (i.e., displays having an active region diagonal of greater than 10 inches) area flat panel displays. In one embodiment of the invention, a backplate made of a ceramic substrate according to the invention provides an order of magnitude improvement in feature position tolerances over existing ceramic substrates (preferably less than 0.01% shrinkage uncertainty).

Electrically conductive traces and regions are formed on layers of multilayer ceramic substrates according to the invention using low cost conventional thick film patterning. High resolution (lines and spaces on the order of less than 2 mils wide) of features on the ceramic substrate according to the invention can be achieved. Vias in ceramic substrates according to the invention are formed using low cost, high tolerance via hole forming techniques such as laser drilling, gang punching or direct infusion.

Unlike the glass backplates used in many previous flat panel displays, backplates made of a high firing temperature ceramic substrate allow the use of high temperature fabrication processes (i.e., greater than 900° C.) which can impart advantageous characteristics to the flat panel device. For example, high temperature processing is necessary for annealing of polysilicon TFTs used as driver circuitry (process temperature of approximately 900° C.) and for annealing thin film phosphors such as cerium activated yttrium aluminum garnet (YAG) (process temperature of approximately 1050° C.) on the backplate of an EL display. The high temperature process can be performed on the ceramic backplate before it is attached to the remainder of the flat panel device.

Additionally, fabrication of the backplate of a flat panel device as a ceramic substrate enables the backplate to be fabricated together with ceramic addressing grids and/or ceramic spacers that may be used in the flat panel device. Since the coefficient of the thermal expansion (CTE) of the backplate is the same as the CTE of the addressing grid and/or spacers, thermal stresses resulting from differential expansion of the backplate and the addressing grid and/or spacers do not arise, so that the backplate can be fired together with the addressing grid and/or spacers.

Ceramic substrates also provide good high-temperature stability and reliability. Also, metallization adhesion to layers of the ceramic is excellent. The good metallization adhesion and dimensional stability at elevated temperatures results in a more robust structure with improved reliability.

Flat panel devices according to the invention include flat panel displays such as cathode ray tube (CRT) displays, plasma (PDP) displays, vacuum fluorescent displays (VFDs), electroluminescent (EL) displays, and liquid crystal displays (LCDs). Flat panel displays according to the invention can be formed with curved faceplate and backplate, and can be formed with two faceplates, rather than a faceplate and backplate. Further, flat CRT displays according to the invention can include either a thermionic cathode or a field emission cathode (FEC) with or without a switching grid. The invention is not limited to flat panel displays, but can include other flat panel devices used for other purposes such as scanning of an image to be reproduced on another medium such as in copiers or printers.

BRIEF DESCRIPTION OF THE DRAWINGS

FIGS. 4A, 4B, 4C, 4D, 4E, 4F, 4G, 4H, 4I, 4A', 4B', 4C', 4D', 4F', 4H', 4K, 4L, 4M, 4N, 4N', 4P, 4Q, 4R, 4S, 4T, 4U, 4V, 4W, and 4X are views illustrating steps in a process to build a flat panel according to one embodiment of the invention.

DETAILED DESCRIPTION OF THE INVENTION

Figure 1:
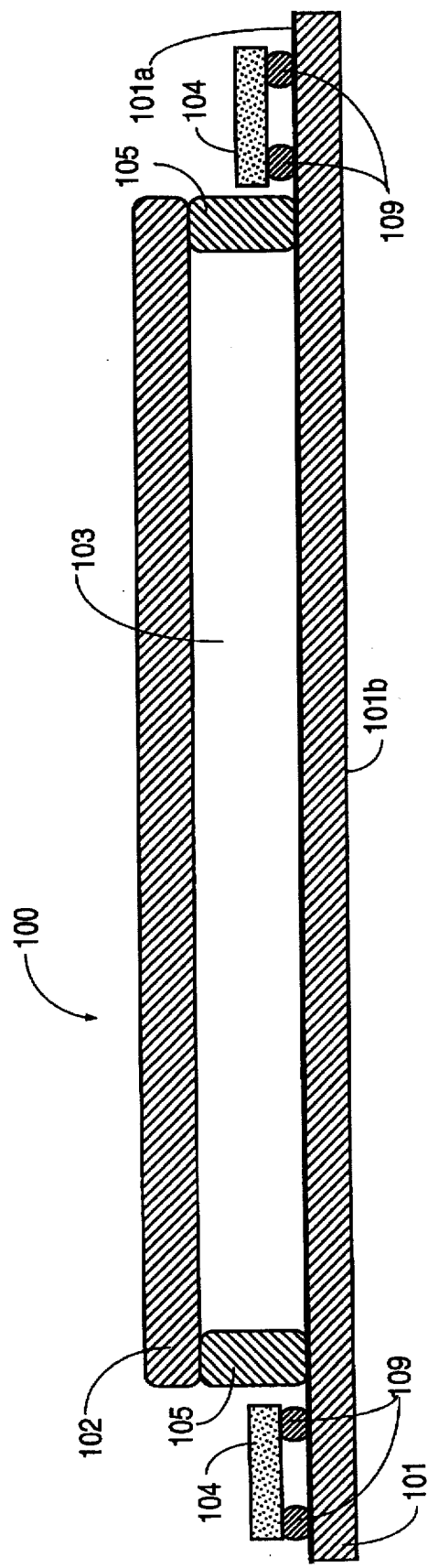
FIG. 1 is a simplified cross-sectional view of a prior art flat panel display including a glass substrate with electrode driver circuitry disposed around the perimeter of the substrate.

In this description and in the claims which follow, the term "ceramic" is often used, in the context of ceramic tape or a ceramic layer or ceramic sheet. The term is intended to refer to any of a known family of glass ceramic tapes, devitrifying glass tapes, ceramic glass tapes, ceramic tapes or other tapes which have plastic binders and ceramic or glass particles and which are flexible and workable in the unfired state, curable to a hard and rigid layer on firing, as well as other materials equivalent thereto, which are initially flexible and may be processed to a final hard and rigid state.

One example of a low temperature ceramic material which can be used for the purposes of this invention is DuPont's Green Tape (trademark of DuPont). This material, available in thin sheets. (e.g., approximately 3 to 10 mils) has a relatively low firing temperature, about 900° C. to 1000° C., and includes plasticizers in the unfired state which provide excellent workability. The Green Tape product is a mixture of ceramic particles and amorphous glass, also in particulate form, with binders and plasticizers. See U.S. Pat. Nos. 4,820,661, 4,867,935, and 4,948,759. The material in the unfired form is adaptable to deposition of conductive metal traces, such as by screen printing or other techniques.

Other materials having the desired properties in the unfired state, such as devitrifying glass tape, ceramic tape or ceramic glass tape material, and possibly amorphous glass in a flexible matrix, are also adaptable for the purposes of the invention; the term "ceramic" is used generally herein to refer to this class of materials. Broadly speaking, the requirements of such a material are that (a) it be producible in thin layers, (b) the layers be flexible in the unfired state, (c) holes can be put in a layer or several layers together in the unfired state, (d) the holes can be filled with conductors where desired, (e) conductive traces can be put accurately on the surfaces of the unfired layers, (f) the layers can be laminated, in that they are bonded together at least on a final firing, (g) the fired structure have a coefficient of thermal expansion that can be substantially matched to that of a face plate and a back plate of preferred materials such as float glass, (h) the fired, laminated structure be rigid and strong, (i) the fired structure be vacuum compatible, (j) the fired structure not contain materials which will poison cathodes, and (k) all materials and fabrication be possible at practical cost.

While the preferred materials appear to be ceramic materials as described above, other materials having these characteristics or most of these characteristics can be used. Polyimides, as an example, are very high temperature, high strength vacuum compatible plastics used for the fabrication of multilayer printed circuit boards in such applications as electronics used in space and may be used with the invention.

Below, embodiments of the invention are described with respect to a flat panel display. Flat panel displays according to the invention can include cathode ray tube (CRT) displays, plasma (PDP) displays, vacuum fluorescent displays (VFDs), electroluminescent (EL) displays, and liquid crystal displays (LCDs). Further, flat CRT displays according to the invention can include either a thermionic cathode or a field emission cathode (FEC) with or without a switching grid. Though the invention is described with respect to flat panel displays, the invention is not limited to use with displays, but can be used with other flat panel devices used for other purposes such as scanning of an image to be reproduced on another medium such as in copiers or printers.

Figure 2A:
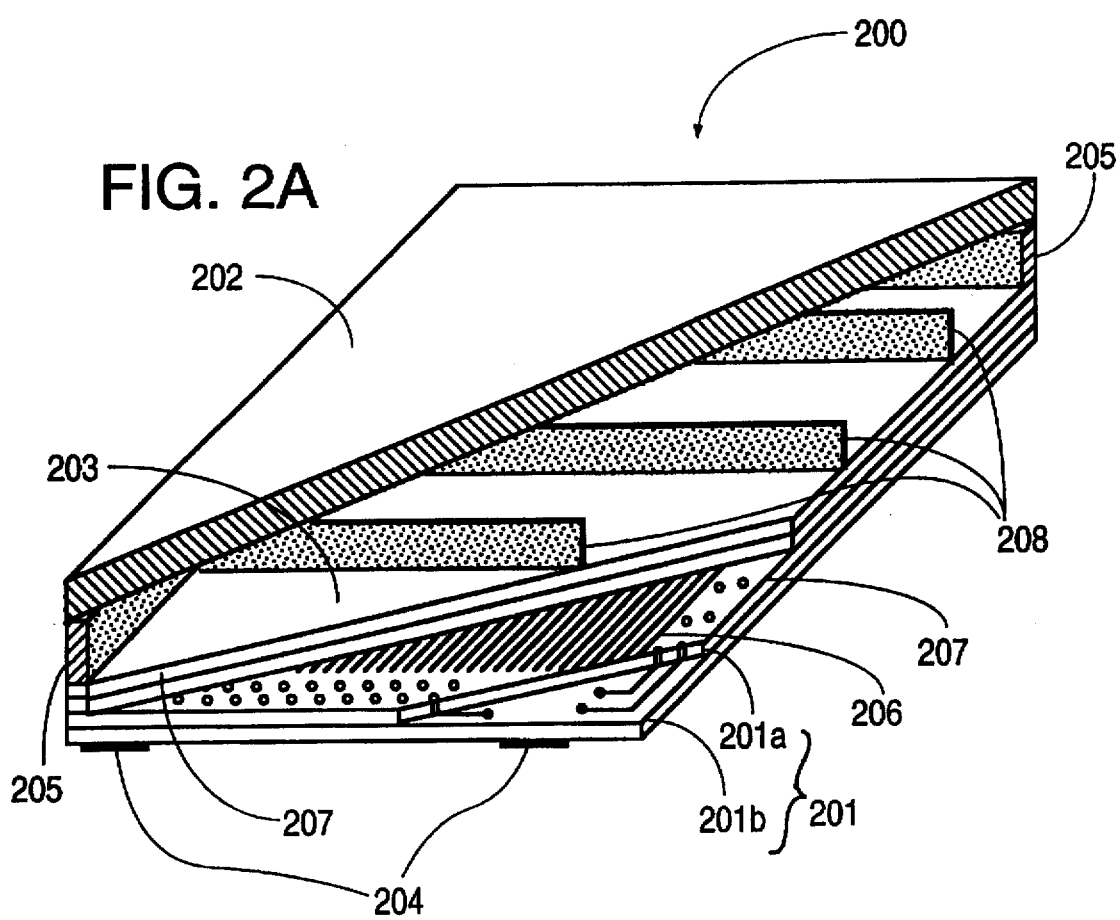
FIG. 2A is a cutaway perspective view of a flat panel display according to an embodiment of the invention.

FIG. 2A is a cutaway perspective view of flat panel display 200 according to an embodiment of the invention. Herein, a flat panel display is a display in which the thickness of the display, measured in a direction substantially perpendicular to the viewing surface of the display, is small compared to the thickness of a typical CRT display. Typically, though not necessarily, the thickness of a flat panel display is less than 2 inches (5.08 cm). Often, the thickness of a flat panel display is substantially less than 2 inches, e.g., 0.1–0.5 inches (0.25–1.3 cm).

Faceplate 202, backplate 201 and side walls 205 form a sealed enclosure 203 that can be held at vacuum pressure (herein, vacuum pressure is defined as any pressure less than atmospheric pressure), e.g., approximately $1 \times 10^{-7}$ torr in some flat CRT displays. Side walls 205, faceplate 202 and backplate 201 are attached to each other with, for example, a frit glass.

Backplate 201 is a co-fired ceramic substrate. In the embodiment shown in FIG. 2A, backplate 201 includes two layers 201a and 201b. However, any desired number of layers can be used, i.e., one, three or more layers. Currently, ceramic substrates having up to 60 layers, e.g., IBM ES9000 module, have been commercially produced.

Within enclosure 203, electrons are emitted from cathode surface 206 toward the phosphor coated interior surface (not visible in FIG. 2A) of faceplate 202 (i.e., anode) from a FEC formed on cathode surface 206. Addressing grid 207 is positioned adjacent cathode surface 206 of backplate 201. Integrated circuit chips 204 (seen more clearly in FIG. 2E, described below) are attached to display 200 outside of enclosure 203 using, for example, the C4 technique. Driver circuitry formed on integrated circuit chips 204 is electrically connected, as explained in more detail below, to addressing grid 207 to enable addressing grid 207 to be used for addressing and focusing electron emissions from the FEC. Use of a grid (such as addressing grid 207) for addressing and focusing a flow of electrons in an emissive flat panel display is explained in more detail in commonly owned, U.S. patent application Ser. No. 08/012,297, filed Feb. 1, 1993, entitled "Grid Addressed Field Emission Cathode," now U.S. Pat. No. 5,541,473.

Figure 2D:
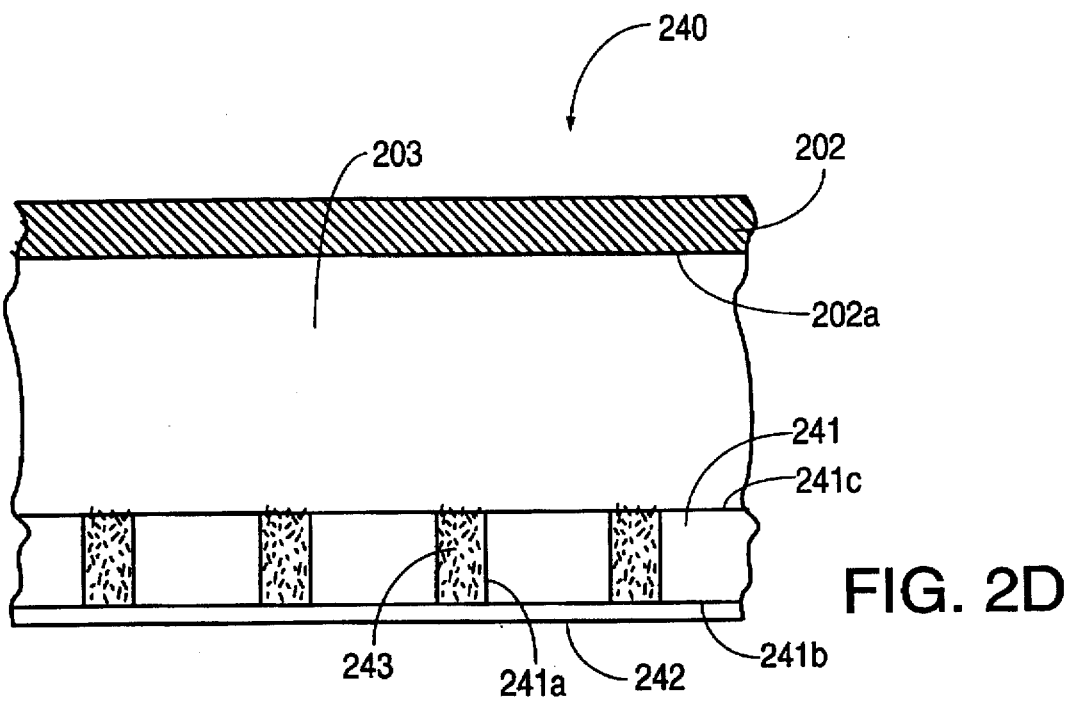
FIG. 2D is a cross-sectional view of a portion of a flat panel display, similar to the flat panel display of FIG. 2A, according to another embodiment of the invention, illustrating another type of field emission cathode.
Figure 2B:
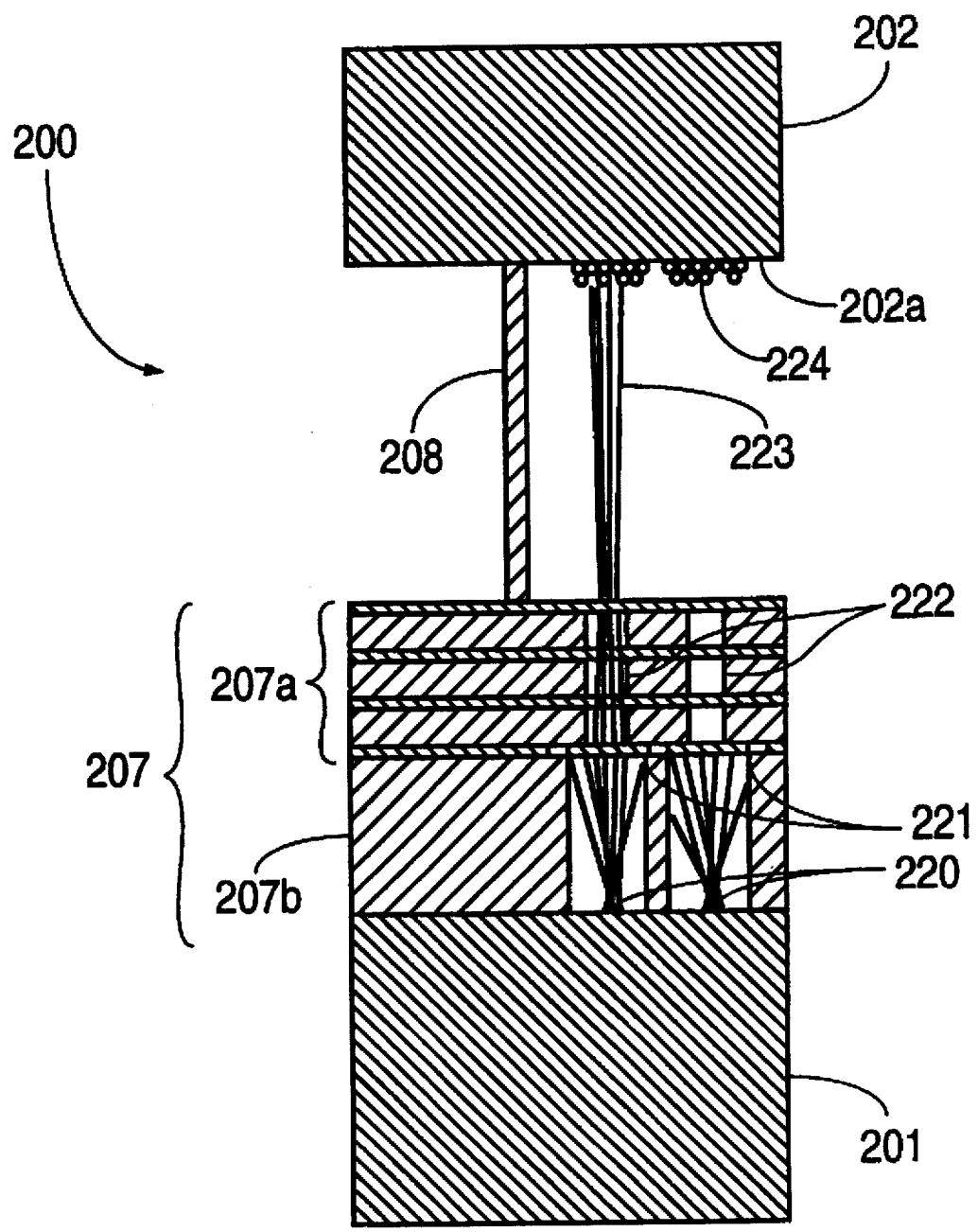
FIG. 2B is a cross-sectional view of a portion of the flat panel display of FIG. 2A, illustrating a field emission cathode and addressing grid.

FIG. 2B is a cross-sectional view of a portion of flat panel display 200, illustrating a FEC and addressing grid 207. Addressing grid includes addressing layers 207a and insulating layer 207b. Emitters 220 (described in more detail below with respect to FIG. 2C) are formed on backplate 201 in holes 221 formed in insulating layer 207b. Addressing layers 207a are disposed on insulating layer 207b. Holes 222 are formed through addressing layers 207a such that holes 222 are coaxial with holes 221. Emitters 220 release electrons 223 (as described in more detail below with respect to FIG. 2C) which are accelerated through holes 221 and 222, as desired, to hit phosphor regions 224 formed on interior surface 202a of faceplate 202. Spacer walls 208 are located so that spacer walls 208 do not interfere with the flow of electrons 223.

Figure 2C:
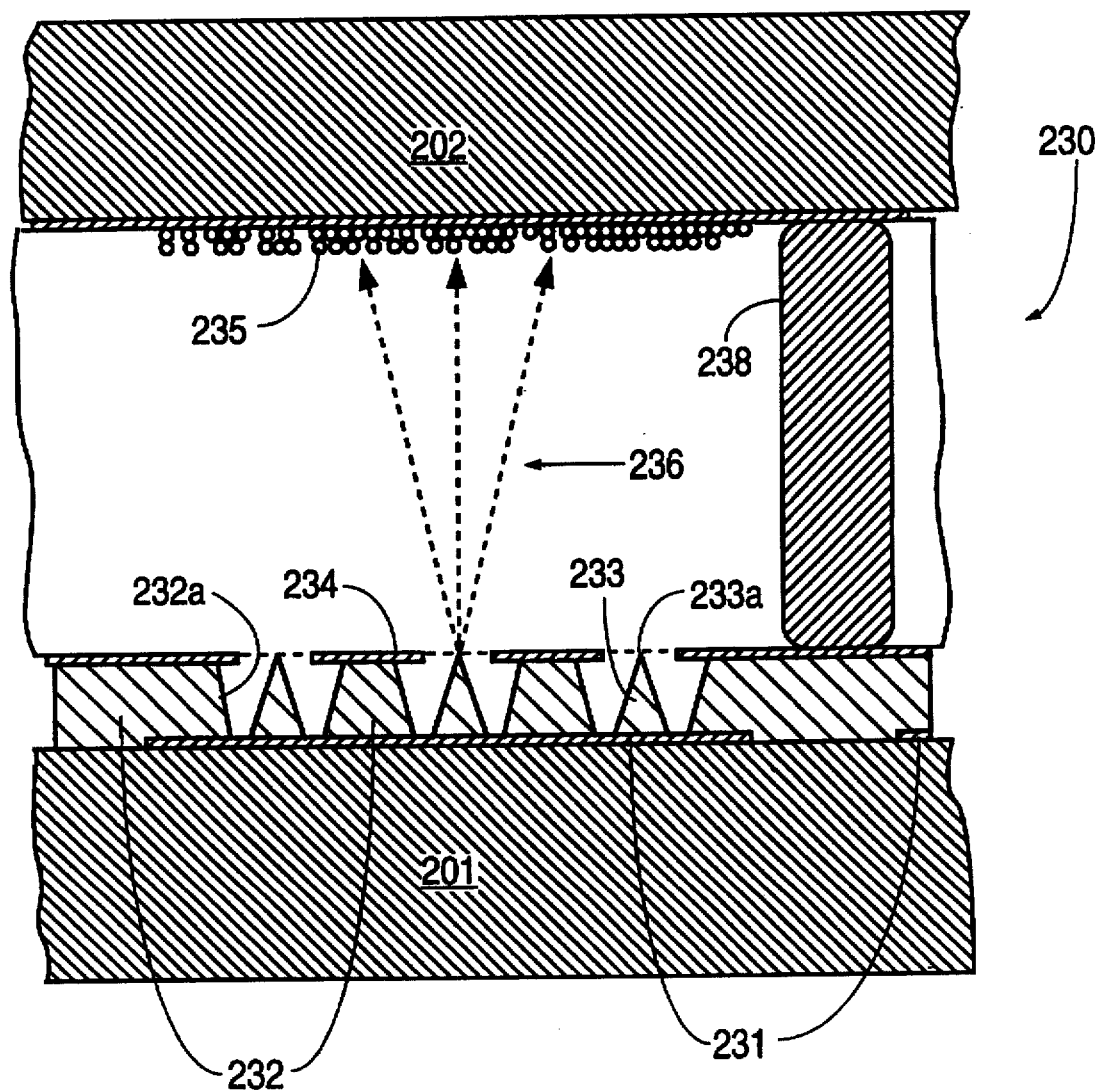
FIG. 2C is a cross-sectional view of a portion of a flat panel display, illustrating a field emission cathode without an addressing grid.

Alternatively, addressing grid 207 can be eliminated and the driver circuitry connected to gate electrodes formed on cathode surface 206 adjacent the emitter locations. In this case, the driver circuitry controls the gate electrodes to address electron emissions from the FEC. FIG. 2C is a cross-sectional view of a portion of flat panel display 230, illustrating a FEC without an addressing grid. A particular type of FEC is shown in FIG. 2C. It is to be understood that other types of FECs could be used. The FEC includes row electrodes 231 formed on backplate 201. Insulator 232 (made of an electrically insulative material) is formed on backplate 201 to cover row electrodes 231. Holes 232a are formed through insulator 232 to row electrodes 231. Emitters 233 are formed on row electrodes 231 within holes 232a. Emitters 233 are cone-shaped and tip 233a of emitter 233 extends just above the level of insulator 232. It is to be understood that other types of emitters could be used. Column electrodes 234 are formed on insulator 232 around holes 232a such that column electrodes 234 extend partially over holes 232a to a predetermined distance from emitter tips 233a. An open space separates column electrodes 234 and emitter tips 233a from faceplate 202. Anode spacer walls 238 extend from the column electrodes 234 to faceplate 202. Phosphor 235 is formed on the surface of faceplate 202 facing the FEC. Emitters 233 are excited to release electrons 236 which are accelerated across the open space to strike the phosphor 235 on faceplate 202. When phosphor 235 is struck by electrons 236, phosphor 235 emits light.

FIG. 2D is a cross-sectional view of a portion of flat panel display 240, similar to flat panel display 200 of FIG. 2A, according to another embodiment of the invention, illustrating another type of field emitter cathode. Backplate 241 is a co-fired ceramic substrate in which a plurality of via holes, e.g., hole 241a, are formed. Each of the via holes, e.g., hole 241a, are filled with a via plug, e.g., via plug 243, by, for instance, using a conventional screening process. The via plug is a conductive glass in which electrically conductive whiskers (made of, for example, tungsten, molybdenum or a tungsten-molybdenum mixture) are mixed. Electrodes, e.g., electrode 242, are formed to contact, for example, a row of filled via holes, e.g., via hole 241a including via plug 243. Other electrodes (not shown) are formed to address the columns of pixels (each pixel corresponding to a filled via hole). These other electrodes can be formed on interior surface 202a of faceplate 202 or surface 241c of backplate 241.

The via holes are formed in the ceramic substrate by, for example, mechanical punching or laser drilling. Row electrodes, e.g., electrode 242, are formed on exterior surface 241b of backplate 241 by a conventional thick film deposition process. The via holes are filled with the via plugs. After the via holes are filled with the via plugs, backplate 241 is fired. The conductive glass in the via plugs is etched using conventional etchants and processes.

Returning to FIG. 2A, spacers 208 support faceplate 202 against addressing grid 207 so that the force arising from the differential pressure between the vacuum within enclosure 203 and the atmospheric pressure outside of enclosure 203 does not cause display 200 to collapse. In some embodiments, enclosure 203 is not held at vacuum pressure; in those embodiments, spacers 208 may not be necessary. Note that, though addressing grid 207 is positioned adjacent cathode surface 206 of backplate 201 in FIG. 2A, addressing grid 207 can be separated from backplate 201 and supported against backplate 201 with spacers analogous to spacers 208. .The use of spacers in flat panel devices is explained in more detail in commonly owned, U.S. patent application Ser. No. 08/012,542, filed Feb. 1, 1993, entitled "Internal Support Structure For Flat Panel Device," by Theodore S. Fahlen, Robert M. Duboc, Jr. and Paul A. Lovoi now allowed.

Figure 2E:
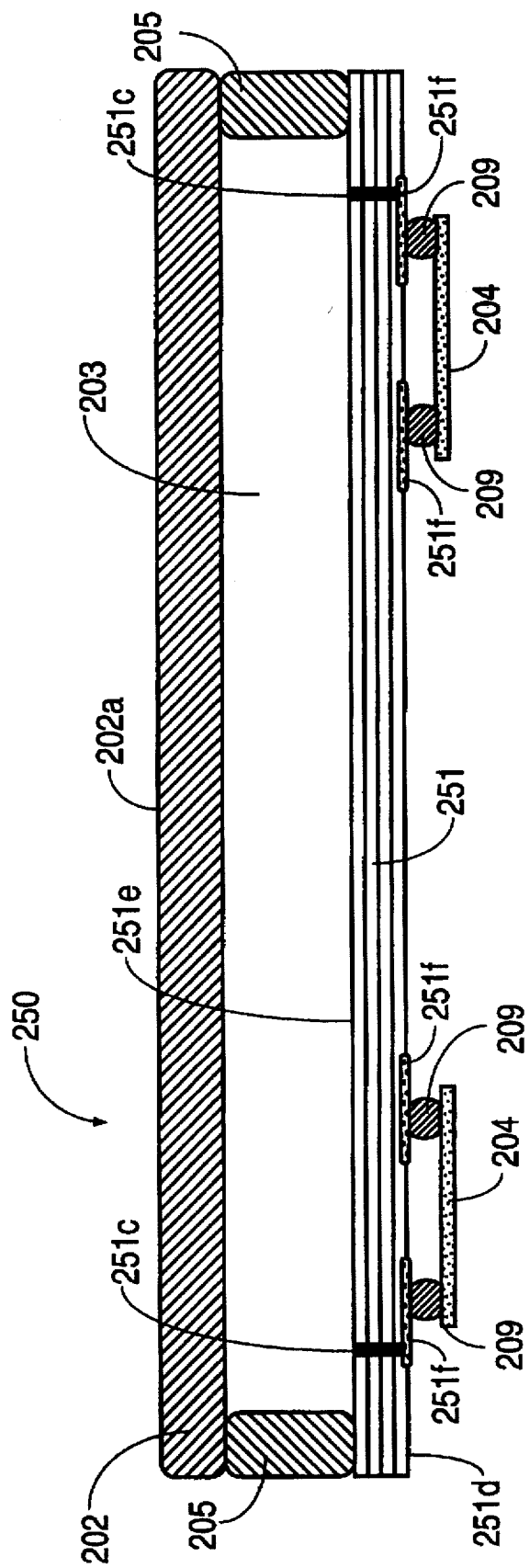
FIG. 2E is a simplified cross-sectional view of a flat panel display according to the invention.

FIG. 2E is a simplified cross-sectional view of flat panel display 250 according to an embodiment of the invention. Flat panel display 250 is similar to flat panel display 200 of FIG. 2A, and like elements are designated by the same numerals. In FIG. 2E, for simplicity, addressing grid 207 and spacers 208 are not shown. Backplate 251 is made of a co-fired ceramic substrate. Electrically conductive vias 251c are formed to interconnect the driver circuitry on integrated circuit chips 204 (driver chips), attached to side 251d of backplate 251 to emitters (not shown in FIG. 2E) on the cathode surface (not visible in FIG. 2E) formed on side 251e of backplate 251. Each via 251c is a hole formed through backplate 251 and filled with electrically conductive material. Each via 251c contacts a corresponding electrically conductive trace 251f formed on surface 251d of backplate 251. Driver chips 204 are attached by, for instance, electrically conductive solder bumps 209. Vias 251c, traces 251f and solder bumps 209 electrically connect the driver chips 204 outside of display enclosure 203 to the emitters within display enclosure 203 so that appropriate emitters can be activated to cause desired areas of the display screen surface 202a of faceplate 202 to light up.

Since the driver chips 204 are mounted on the exterior surface of the backplate 251, rather than on a surface of the backplate 251 or addressing grid 207 surrounding the periphery of the active region of the device (edge-mounted drivers), as in previous flat panel devices, the flat panel device 200 according to the invention can be made smaller (for an active region of a given size) or can be made with a larger active region (for a given overall device size). Further, less ceramic is used in making flat panel device 200 according to the invention, since the backplate 251 does not extend as far as in previous flat panel devices, thus enabling the flat panel device 200 to be constructed at less cost.

The ability to mount electronic components (such as driver chips 204) on the exterior surface 251d of backplate 251 provides other benefits. The edge-mounted driver chips of previous flat panel displays were limited in size because of the desire to minimize the peripheral mounting area (and, thus, the overall size) of the display. In flat panel device 200 according to the invention, larger driver chips 204 having a higher pin count can be used, thus reducing the required number of driver chips 204 that must be mounted to the backplate 251, thereby increasing the speed with which the device 200 can be produced and reducing manufacturing costs.

In previous flat panel displays, edge-mounted driver chips were electrically connected to circuitry on the display by wirebonding the chips to the display. In flat panel device 200 according to the invention, the driver chips 204 can be mounted on the exterior surface 251d of the backplate 251 using commercially available techniques such as IBM's controlled collapse chip connection (C4) process which are easier and cheaper to implement than wirebonding.

Though, in FIG. 2E, vias 251c are shown extending straight through backplate 251 (through-hole vias) from trace 251f on surface 251d to the emitters formed on surface 251e, this need not (and often will not) be the case. Vias can be formed such that the vias extend from an exposed surface, e.g., surface 251d, of backplate 251 through only a part of backplate 251 (semi-blind vias), contacting an electrically conductive trace or region buried within backplate 251 and an electrically conductive trace or region formed on either surface 251d or 251e (see, e.g., FIG. 2F below). Further, vias can be formed such that the vias do not extend to either surface 251d or 251e of backplate 251, but are completely buried within backplate 251 (buried vias), contacting at either end of the vias an electrically conductive trace or region that is also buried within backplate 251. The electrically conductive traces and regions buried within backplate 251 can be used for signal routing or for providing ground or power planes within backplate 251.

As noted above, driver circuitry can be formed on a surface of the backplate by, for example, forming thin film transistors (TFTs), e.g., polysilicon TFTs, on the interior surface of the backplate. Further, row or column drivers can be formed on the interior surface of the backplate rather than on the exterior surface as described above. Further, if driver chips are used, they can be mounted on either surface of the backplate.

Figure 2F:
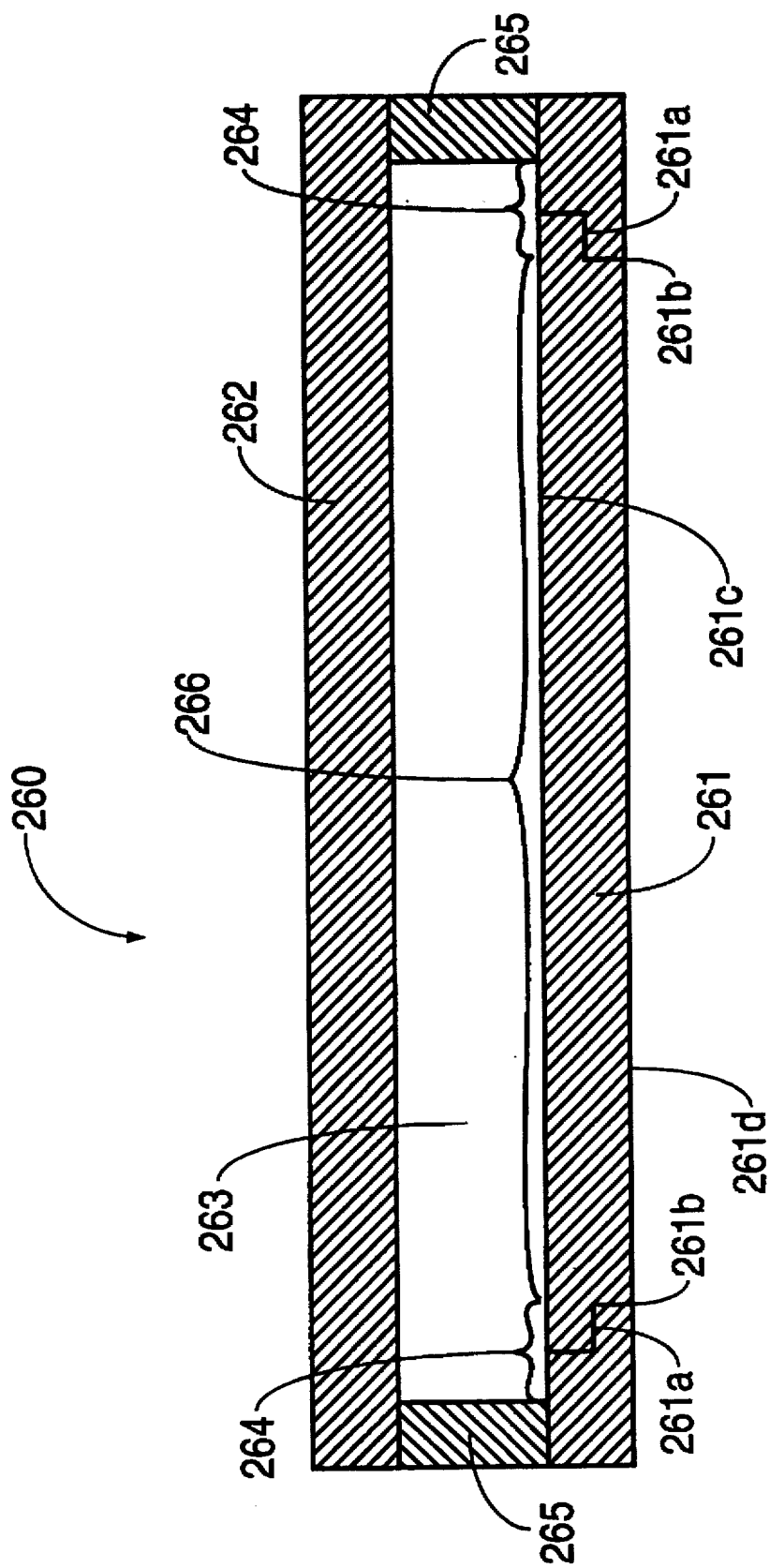
FIG. 2F is a cross-sectional view of a flat panel display according to another embodiment of the invention.

FIG. 2F is a cross-sectional view of flat panel display 260 according to another embodiment of the invention. Faceplate 262, side walls 265 and backplate 261 are attached together in a manner described elsewhere in this description to form sealed enclosure 263. Rather than having driver chips mounted on the exterior surface of backplate 261, as in the embodiments of the invention described above, in flat panel display 260, either TFTs (not shown), e.g., polysilicon TFTs, are formed on interior surface 261c of backplate 261, or driver chips are attached to interior surface 261c, in the areas denoted as 264 in FIG. 2F. The area 264 is outside of the cathode area 266 of interior surface 261c. The polysilicon driver circuits or driver chips are electrically connected by electrically conductive vias and traces, designated generally as 261a, to a bonding location 261b on exterior surface 261d of backplate 261. The polysilicon driver or driver chips are controlled by a conventional controller not part of flat panel display 260 to address pixels of flat panel display 260.

If TFTs are used, the TFTs are preferably made of polysilicon because of the faster switching speeds that can be achieved. However, in another embodiment, the TFTs can be made of amorphous silicon. The use of a ceramic to make backplate 261 allows use of the high processing temperature necessary to anneal polysilicon TFTs. Use of TFTs as described allows a cost reduction to be achieved in producing a flat panel display according to the invention since the TFTs replace the single crystal silicon chips used as driver chips. Further, use of TFTs improves the reliability of the display since the many connections between the driver chips and the backplate are no longer required.

Above embodiments of the invention include a field emission cathode. A thermionic cathode can also be used in a flat panel display according to the invention. An embodiment of the invention in which a thermionic cathode can be used is described in more detail below with respect to FIG. 7.

The operation and construction of a flat panel display including a thermionic or field emission cathode is also described in detail in commonly owned, U.S. patent application Ser. No. 07/867,044, filed Apr. 10, 1992, entitled "Self Supporting Flat Video Display," now U.S. Pat. No. 5,424,605.

According to the invention, the ceramic substrate is a co-fired substrate, i.e., both the ceramic layer or layers and the material that forms the electrically conductive traces and regions on the ceramic layer or layers and fills vias in the ceramic layer or layers are fired at the same time. The ceramic substrate according to the invention includes one or more thin (0.3–15 mil) ceramic layers. The ceramic substrate can include any number of layers; as many as 60 layers have been used in commercially available ceramic substrates (e.g., IBM ES9000 module). More typically, the ceramic substrate includes 5–10 layers.

Figure 3:
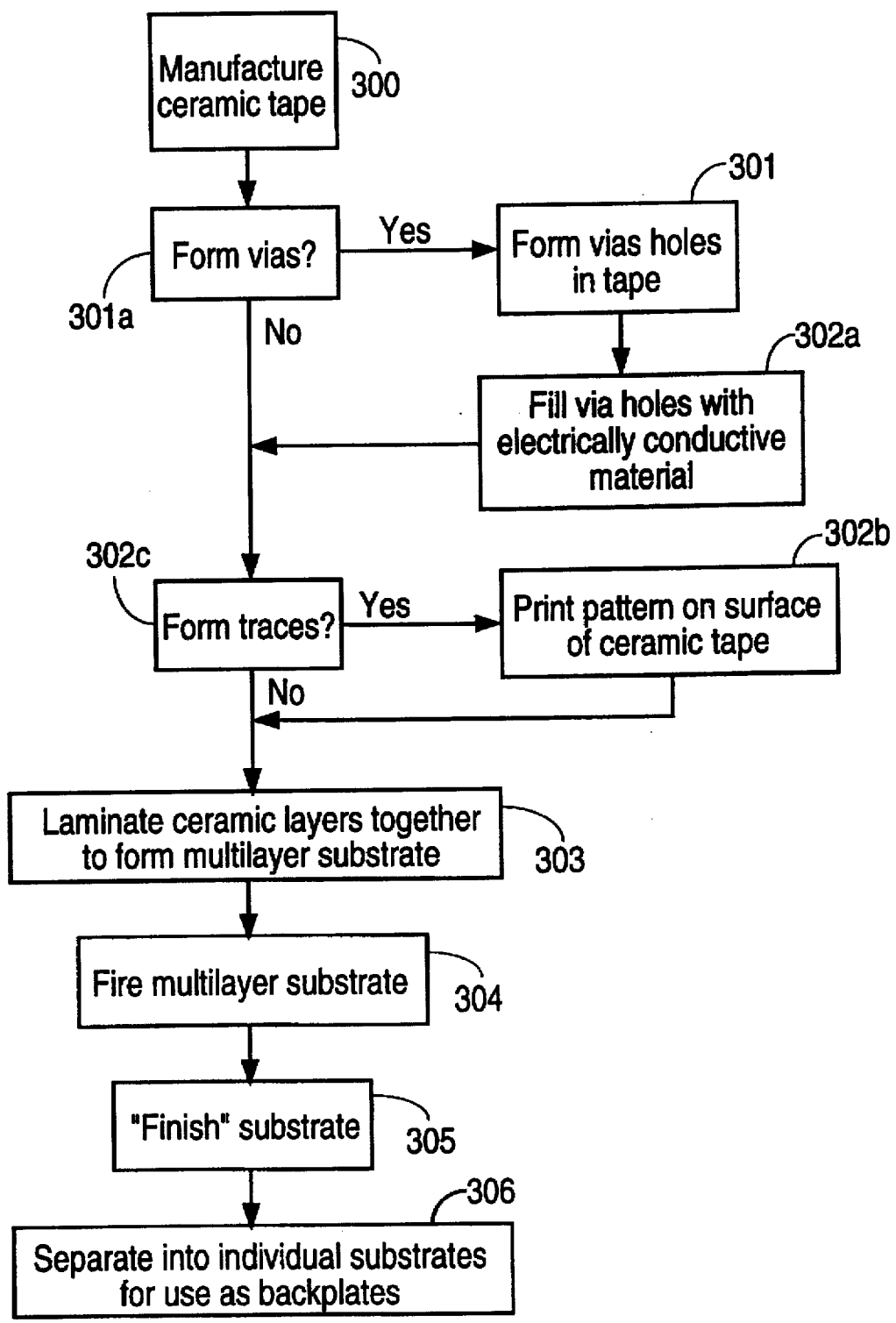
FIG. 3 is a block diagram illustrating a manufacturing process for producing multilayer co-fired ceramic substrates according to the invention.

FIG. 3 is a block diagram illustrating a manufacturing process for producing multilayer co-fired ceramic substrates according to the invention. As shown by block 300, individual layers of the substrate are manufactured as a green ceramic tape, i.e., a mixture of ceramic and amorphous glass particles with binders and plasticizers. Various material compositions and process steps can be used to produce a green ceramic tape for use with the invention; specific examples are described in more detail below. Green ceramic tape is available in very thin sheets (e.g., about 0.3 mils to 15 mils); thus, multilayer substrates can be manufactured with high electrical conductor density. In the unfired state, green ceramic tape has excellent workability, particularly in the forming of small diameter, closely spaced, high aspect ratio holes, such as are necessary for forming vias. Unfired, green ceramic tape has mechanical properties similar to durable plastic sheets, i.e., flexibility and strength, and is, therefore, tolerant of processing and handling.

Once the ceramic tape has been formed, via holes, if necessary, as indicated by block 301a, are formed at appropriate locations through various sheets of the ceramic tape, as shown by block 301. Vias can be formed by, for example, mechanical punching or laser drilling.

At some time before, after, or during the manufacture of the ceramic tape and forming of via holes, an electrically conductive material is prepared that is used to fill the via holes and to pattern electrically conductive traces and regions (hereinafter referred to as "metallization") on one or more surfaces of some or all of the sheets of ceramic tape. Though metals are often used, and the patterned traces and regions will be referred to herein as metallization, it is to be understood that the electrically conductive material need not be metal. For example, an electrically conductive glass frit could be used. The particular electrically conductive material used is chosen to be compatible with the material of which the ceramic tape is made.

As shown by block 302a, the via holes are filled with the electrically conductive material. As shown by block 302b, the electrically conductive material is also used to form, if necessary, as indicated by block 302c, desired metallization patterns on one or more surfaces of the sheet of ceramic tape. The metallization is patterned using a conventional thick film screen printing process. The thick film screen printing process results in conductors having a relatively large cross-sectional area, so that the conductors are robust and have good electrical conductivity. A high conductor density, e.g. 150–250 conductor lines per inch, can be achieved on each layer.

As shown by block 303, the sheets of ceramic tape are then laminated to form a multilayer substrate, and, as shown by block 304, fired to fuse the sheets of ceramic tape together to form an integral, rigid, vacuum compatible substrate. Within, the multilayer substrate, the vias formed in each sheet combine to form through-hole, blind and semi-blind vias that serve as electrical interconnects between metallization, e.g., electrically conductive traces, formed on different layers of the ceramic substrate. The use of a multilayer ceramic substrate with metallization on each layer and vias interconnecting metallization on different layers enables the effective conductor density (i.e., the equivalent conductor density on a single layer) to be greatly increased since, theoretically, the effective conductor density can be made as large as the conductor density on a single layer multiplied by the number of layers.

As shown by block 305, after lamination and firing to form a multilayer ceramic substrate, "finishing" steps are performed on the substrate. Such finishing steps can include, for example, polishing areas of a surface of the substrate on which it is desired to perform thin film deposition of, for instance, field emitters. As another example, selective electroplating can be performed to cover metallization formed on a surface of the substrate to prevent oxidation of the metallization (e.g., tungsten metallization can be electroplated with nickel).

After the finishing steps, the multilayer substrate is, typically, separated by, for example, conventional mechanical cutting into smaller substrates that are used for backplates in flat panel devices, as shown by block 306.

FIGS. 4A through 4X and 4A' through 4H' give a schematic illustration of steps in the process of formation of a flat panel display according to the invention. Although FIGS. 4A through 4X and 4A' through 4H' illustrate one embodiment, alternative embodiments are possible.

FIG. 4A illustrates a sheet of unfired blank ceramic tape 90 which is used to construct an addressing grid for use in a flat panel display. In FIG. 4B, via holes 92 are formed through the sheet of ceramic tape 90.

In FIG. 4C, via holes 92 are filled with electrically conductive material to form electrically conductive vias 94. The via filling is accomplished by screen printing (or other methods) of the conductive material into via holes 92.

In FIG. 4D, electrically conductive traces 96 are deposited on ceramic sheet 90 using, for example, screen printing techniques. Other types of printing may be used. A drying step may follow in which ceramic sheet 90 is heated sufficiently to remove the volatiles from the inks of traces 96. Traces 96 (which will lie in different directions on different sheets of the material) are positioned in paths where the pixel holes will be located. On some ceramic sheets 90, vias 94 may also have traces 96 deposited over them.

In FIG. 4E, pixel holes 97 are formed in ceramic sheet 90. Pixel holes 97 can be formed in the same manner as via holes 92 (FIG. 4B).

In FIG. 4F, a series of ceramic sheets 90a, 90b, 90c, 90d, 90e have been stacked onto ceramic sheet 90 and laminated together. Pixel holes 97 are formed identically in each layer, so that pixel holes 97 are in good registry in the resulting laminated structure 90x. Lamination may be accomplished at this stage by applying pressure to the stack of ceramic sheets 90a, 90b, 90c, 90d, 90e with platens heated to a low temperature, e.g., 50° C. This low heat is sufficient to fuse together the organic binders in each of ceramic sheets 90a, 90b, 90c, 90d, 90e so that ceramic sheets 90a, 90b, 90c, 90d, 90e are bound together by the organic binders. In FIG. 4F, in addition to traces 96 running in the horizontal direction on ceramic sheet 90, other traces, e.g., traces 96a, 96b and 96c on ceramic sheets 90a, 90b and 90c, respectively, are shown, some running horizontally and some vertically.

In FIG. 4G, after formation of the laminated structure 90x, pixel holes 97 are treated with a flow-through of abrasive-containing fluid, preferably liquid (for example, water containing silicon carbide sub-mil particles). This treatment is performed by supporting laminated structure 90x on opposing sides with die plates. The pumping of abrasive-containing liquid through pixel holes 97, with the die plates on either side of laminated structure 90x to channel the flow, effectively reams all pixel holes 97 to ensure that all pixel holes 97 are the desired size and shape, correcting any minor irregularities in registry of pixel holes 97 between ceramic sheets, e.g., ceramic sheets 90a, 90b.

In FIG. 4H, laminated structure 90x is fired, in a stepped or profile firing. For example, the firing may proceed to a temperature of about 350° C., for example, burning out the organics, and then increase in a prescribed profile up to about 950° C., sintering the ceramic, depending on the materials.

As described above with respect to FIG. 2A, the addressing grid can be supported at front and back by spacers located between the faceplate and addressing grid and between the backplate and addressing grid.

The firing step indicated in FIG. 4H (which may include firing of a spacer structure in combination with the grid, as just described), bonds ceramic sheets 90, 90a, 90b, 90c, 90d and 90e of laminated structure 90x together into an integral structure having conductive traces between layers and, possibly, on one or both of the exposed surfaces of laminated structure 90x. If all of the conductive traces are within laminated structure 90x, conductive vias 94 are used to make electrical connection to locations at the exterior of laminated structure 90x.

In FIG. 4I, solder glass 98 (similar to an ink or paint) is applied to the front and back surfaces of laminated structure 90x in a peripheral rectangular pattern that is used to seal the finished flat panel display. After application, the solder glass is pre-glazed (as also indicated in FIG. 4I) by heating laminated structure 90x to a temperature high enough to burn off the binders and fuse the glass particles together, but low enough not to cause devitrification (for solder glass that devitrifies). This preglaze temperature is generally between 400° C. to 600° C. depending on the binder and solder glass used (see steps listed in Table I below for a particular embodiment). Preglazing ensures that the binders, including organics, are cleanly burned away before the display is sealed.

FIG. 4A' illustrates a sheet of unfired blank ceramic tape 90 which is used to construct a backplate for use in a flat panel display according to the invention.

In FIG. 4B', via holes 92 are formed through the sheet of ceramic tape 90.

In FIG. 4C', via holes 92 are filled with electrically conductive material to form electrically conductive vias 94. The via filling is accomplished by screen printing (or other methods) of the conductive material into via holes 92.

In FIG. 4D', electrically conductive traces 96 are deposited on ceramic sheet 90 using, for example, screen printing techniques. Other methods may be used. A drying step may follow in which ceramic sheet 90 is heated sufficiently to remove the volatiles from the inks of traces 96. On some ceramic sheets 90, vias 94 may also have traces 96 deposited over them.

In FIG. 4F', a series of ceramic sheets 90a, 90b, 90c, 90d, 90e have been stacked on to ceramic sheet 90 and laminated together. Lamination may be accomplished at this stage by applying pressure to the stack of ceramic sheets 90a, 90b, 90c, 90d, 90e with platens heated to a low temperature, e.g., 50° C. This low heat is sufficient to fuse together the organic binders in each of ceramic sheets 90a, 90b, 90c, 90d, 90e so that ceramic sheets 90a, 90b, 90c, 90d, 90e are bound together by the organic binders. In FIG. 4F', in addition to traces 96 running in the horizontal direction on ceramic sheet 90, other traces, e.g., traces 96a, 96b and 96c on ceramic sheets 90a, 90b and 90c, respectively, are shown, some running horizontally and some vertically. The traces may not be regular in spacing nor do they have to run along either axis.

In FIG. 4H', laminated structure 90x is fired, in a stepped or profile firing. For example, the firing may proceed to at a temperature of about 350° C., for example, burning out the organics, and then increase in a prescribed profile up to about 950° C., sintering the ceramic, depending on the materials.

The backplate can be supported by spacers located between the faceplate and backplate or through the grid if used between the backplate and the faceplate.

The firing step indicated in FIG. 4H' (which may include firing of a spacer structure in combination with the backplate), bonds ceramic sheets 90, 90a, 90b, 90c, 90d and 90e of laminated structure 90x together into an integral structure having conductive traces between layers and, possibly, on one or both of the exposed surfaces of laminated structure 90x. If all of the conductive traces are within laminated structure 90x, conductive vias 94 are used to make electrical connection to locations at the exterior of laminated structure 90x.

Solder glass (similar to an ink or paint) is applied to the surfaces of laminated structure 90x in a peripheral rectangular pattern that is used to seal the finished flat panel display. After application, the solder glass is pre-glazed by heating laminated structure 90x to a temperature high enough to burn off the binders and fuse the glass particles together, but low enough not to cause devitrification (for solder glass that devitrifies). This preglaze temperature is generally between 400° C. to 600° C. depending on the binder and solder glass used. Preglazing ensures that the binders, including organics, are cleanly burned away before the display is sealed.

FIGS. 4K through 4N indicate schematically the production of the backplate assembly, which is assembled to the addressing grid and to the anode assembly (described below). In these figures and this discussion it is assumed that a thermionic cathode is used. However, the cathode may alternatively be a field emission cathode.

FIG. 4K indicates faring of the solder glass 98 on the sheet of material 16, which may be at about 400° to 600° C. as above.

In FIG. 4L the attachment of a cathode frame 91 is indicated. The cathode frame preferably comprises a conductive metal strip at top and bottom to which all cathode wires are secured; one or both sides preferably have spring strips (not shown) to which the cathode wire ends are secured so as to maintain tension in the wires through thermal changes.

FIG. 4M shows a wire cathode 22, having been secured via the cathode frame 91.

In FIG. 4N the cathode wires 22 are indicated as being coated with tricarbonate, a conventional procedure which may be accomplished by electrophoresis. Spraying is an alternative process. By this process, carbonates of several metals such as strontium, calcium and barium are coated onto a tungsten wire (which may be thoriated as in the known process). In a later bakeout step under vacuum, the carbonates deposited on the cathode filaments are converted to oxides and all binding material is removed, a process well known in the industry. These steps assure that the assembled tube will have a clean cathode. Alternatively, bicarbonate mixes also give acceptable performance later forming a useful and efficient oxide cathode. This completes the backplate/cathode assembly.

FIG. 4N' shows the frame 91 with the cathode 22 removed from the back plate 16, in exploded view for clarity (not indicating order of assembly). This completes the fabrication of the backplate assembly.

FIGS. 4P through 4S relate to production of the faceplate assembly. To a sheet of glass 91a is applied a rectangular band of solder glass 98.

In FIG. 4Q is indicated the firing of the solder glass 98 to a preglaze state.

FIG. 4R indicates the phosphor application process to the face plate 91a. In lieu of R, G and B phosphor dots for each pixel, R, G and B phosphor stripes may be applied, in a known conventional manner. Use of a flat glass face plate allows the use of alternate methods such as offset printing to apply the phosphor material. The phosphor is generally indicated as 93 in FIG. 4R.

FIG. 4S indicates aluminizing of the anode, i.e. covering the phosphor with a thin layer of aluminum 93a, to protect and maintain the integrity of the phosphor and to increase the tube brightness by redirecting some of the reardirected photons toward the viewer. With aluminization, electrons must have a threshold level of energy to pierce the aluminum and excite the phosphor. This completes production of the faceplate 12.

FIGS. 4T through 4X indicate steps in assembly of the three components together: the backplate assembly 93b, the multilayer addressing grid structure 35 and the anode assembly 12. (Below, laminated structure 90x, which may include integral supports as described above, is designated in FIGS. 4T through 4X as addressing grid 35.) The preferred embodiment is carried out entirely in vacuum. FIG. 4T indicates bakeout of the three components under vacuum, and FIG. 4U shows the lamination/assembly of the three components together, producing an assembly 95. In the preferred embodiment the tube is baked out unassembled because the high internal structure surface area as compared to internal tube volume makes conventional tabulation pumpout less desirable in production.

In FIG. 4V the assembly is heated to the extent that the solder glass seals soften and fuse together, typically at 450° C. for certain types of solder glass, and at times as prescribed in the material specification. Solder glass preglazing and sealing temperatures and times are generally specified by the glass manufacturer or are determined by the user using techniques known to those skilled in the art. Table I below gives an example for a preferred embodiment.

FIG. 4W indicates one or more getters being processed. For example, if a flashed getter is used, a thin film or strip of metal (having an affinity for oxygen) is heated by electrical resistance and plated against appropriate surfaces inside the tube, such as in one or more peripheral areas of the ceramic grid plate, outside the active addressing area. Active getters can also be used, wherein the getters act as vacuum ion pumps, active whenever the tube is powered.

Finally, FIG. 4X indicates connection of the drivers 20 to the rear of the backplate structure 93b. This involves making electrical contact between the drivers 20 and the conductive traces, vias or busses extending along the surfaces of the peripheral areas of the addressing grid structure 35.

Table I outlines the processes depicted in FIGS. 4A through 4X and 4A' through 4H' and gives times, temperatures and materials for certain of the fabrication steps described with respect to those figures. It is to be understood that this is merely an illustrative embodiment and that other processes can be used.

TABLE 1

| Figure Number | Step Description | Process and Materials |
|---|---|---|
| Grid Assembly | | |
| 4A | Blank Tape for Grid | Blank ceramic tape per material specification. |
| 4B | Via Holes | Form via holes as by mechanical stamping or laser drilling. |
| 4C | Fill Via Holes | Print (screen or other technique) via filling paste in via holes, per material specifications. |

TABLE 1-continued

| Figure Number | Step Description | Process and Materials |
|---|---|---|
| 4D | Conductive Traces | Print conductive traces, per material specifications. |
| 4E | Holes for Pixels | Form holes for pixels. |
| 4F | Laminate Stacked Green Tape Layers | 70° C. @ 3000–4000 psi for 10 minutes. |
| 4G | Clear Holes with Abrasive Fluid | Pump Water with 1 um SiC particles in suspension at 200 psi until clear (1–2 minutes). |
| 4H | Profile (Step) Firing | Firing schedule for 7 layer 2" test samples<br>1. Room temperature (RT) to 350° C. at 10° C./min.<br>2. 350° C. for 55 min. (binder burn-out)<br>3. 350° C. to 950° C. at 10° C./min.<br>4. 950° C. for 30.0 min.<br>5. 950° C. to 840° C. at 10° C./min.<br>6. 840° C. to 500° C. at 6.5° C./min.<br>7. 500° C. to RT at 6.5° C./min. or less.<br>All temperatures are ±5° C., all ramps are ±10%.<br>Firing schedule for larger parts will differ from the above schedule as follows:<br>Larger and thicker parts need slower ramp up times and longer binder burn-out times (these times must be determined for each specific part). |
| 4I | Apply Solder Glass | 1. Screen print CV120 Owens Illinois solder glass (−325 mesh) onto parts to be joined; anode, grid (both sides), and cathode.<br>2. Dry at 100° C. with IR lamp for 30 min.<br>3. Repeat process until a .004 in layer is built up. |
| 4I | Pre-glaze Solder Glass | 1. Place part on grate of traveling grate furnace or batch air oven and raise to 360° C. at 5° C./min.<br>2. 360° C. for 30 min. (Binder burn-out).<br>3. Cool to room temperature @ 3° C./min. |

Backplate Assembly

| Figure Number | Step Description | Process and Materials |
|---|---|---|
| 4A' | Blank Tape for Backplate | Blank ceramic tape per material specification. |
| 4B' | Via holes | Form via holes by mechanical stamping or laser drilling |
| 4C' | Fill via holes | Print (screen or other technique) via filling paste in via holes, per material specifications. |
| 4D' | Conductive traces | Print conductive traces, per material specifications |
| 4F | Laminate stacked green tape layers | 50° C. @ 500–1000 psi for 30 seconds |
| 4H' | Profile (step) firing | Firing schedule for 7 layer 2" test samples<br>1. Room temperature (RT) to 350° C. at 10° C./min.<br>2. 350° C. for 55 min. (binder burn-out)<br>3. 350° C. to 550° C. at 10° C./min.<br>4. 950° C. for 30.0 min.<br>5. 950° C. to 840° C. at 10° C./min.<br>6. 840° C. to 500° C. at 6.5° C./min.<br>7. 500° C. to RT at 6.5° C./min. or less.<br>All temperatures are ±5° C., all ramps are ±10%.<br>Firing schedule for larger parts will differ from the above schedule as follows:<br>Larger and thicker parts need slower ramp up times and longer binder burn-out times (these times must be determined for each specific part). |
| 4K | Apply solder glass | 1. Screen print CV120 Owens Illinois solder glass (−325 mesh) onto parts to be joined; anode, grid (both sides), and cathode.<br>2. Dry at 100° C. with IR lamp for 30 min.<br>3. Repeat process until a .004 in layer is built up. |
| 4K | Pre-glaze solder glass | 1. Place part on grate of traveling grate furnace or batch air oven and raise to 360° C. at 5° C./min.<br>2. 360° C. for 30 min. (Binder burn-out).<br>3. Cool to room temperature @ 3 °C./min. |
| 4L | Cathode Frame | Attach cathode frame to cathode backplate. |
| 4M | Wire Cathode | Attach cathode wires to cathode frame. |
| 4N | Tricarbonate on Cathode | Electrophoresis (or other deposition) of tricarbonate or bicarbonate onto cathode wires. |

Faceplate Assembly

| Figure Number | Step Description | Process and Materials |
|---|---|---|
| 4P | Apply Solder Glass | Apply solder glass to seal area on faceplate (See 4I, above). |
| 4Q | Pre-glaze Solder Glass | (See 4I, above). |
| 4R | Apply Phosphors | Deposit (by screen printing, or other photolithographic technique) phosphors for pixel dots on anode side of faceplate. |
| 4R | Apply Lacquer | Spray acrylic lacquer film over phosphors |
| 4S | Aluminize Screen | Cover phosphor with thin layer of aluminum. |

Assembly

| Figure Number | Step Description | Process and Materials |
|---|---|---|
| 4T | Jig Assemble | Assemble cathode, grid and anode with suitable jigs, fixtures, holding parts to be joined apart. |
| 4T | Forming Cathode | 1. Place part in a vacuum furnace.<br>2. Pump vacuum station to $5 \times 10^7$ Torr.<br>3. RT to 300° C. at 5° C./min.<br>4. Apply 1/10 of cathode operating voltage in step fashion. Allow the vacuum pressure to stablize for 2 min. before advancing to the next voltage step.<br>5. At .6 of the cathode operating voltage hold for 10 min. until color stabilizes.<br>6. Advance voltage in steps of 1/10 of cathode operating voltage up to the cathode operating voltage. Allow the color and vacuum to stabilize before advancing to the next voltage step.<br>7. Turn off power to cathode. |
| 4T | Vacuum Bake-Out | 1. Outgas tube at 300° C. until pressure stabilized at $1 \times 10^{-6}$ Torr.<br>2. Continue to outgas for 1 hour. |
| 4U | Assemble Tube | Bring together the cathode/back plate assembly, the addressing grid and the anode/face plate for joining. |
| 4V | Seal Solder Glass | 1. Beginning temperature to 450° C. at 5° C./min.<br>2. 450° C. for 30 min.<br>3. 450° C. to room temperature at 5° C./min. |
| 4W | Process Getter | Process flash getter by application of prescribed voltage. |

TABLE 1-continued

| Figure Number | Step Description | Process and Materials |
|---|---|---|
| 4X | Attach ASICs | Connect ASIC drivers to completed assembly, with electrical contact to conductive traces, vias and busses. |

An important aspect of formation of ceramic substrates by co-firing green ceramic tape is that many of the processing steps in the fabrication of multilayer co-fired ceramic substrates according to the invention are independent of the materials in the finished ceramic substrate. As noted above, green ceramic tape is easily workable so that the formation of vias is performed readily, independent of the ceramic and/or glass materials in the tape. The application of the metallization paste to fill vias and form metallization on the surface of the green ceramic tape is also independent of the materials used in the green ceramic tape and the metallization paste, as is the lamination of the sheets of ceramic tape. Material dependency first manifests itself in the firing step, where furnace atmospheres and temperatures vary according to the material compositions of the ceramic tape and metallization paste.

Further, the cost of tooling and the forming of vias in green ceramic tape is declining rapidly, thus making use of ceramic substrates for flat panel display backplates increasingly cost effective. For instance, laser drilling of vias in green ceramic tape offers a high throughput without requiring custom tooling. Programmable gang punch tooling can be used with some ceramic substrates to increase the rate of via formation.

Though use of ceramic substrates as flat panel display backplates necessitates high predictability of features, for some displays, this may not necessitate use of a material having precise predictability of feature location. As noted above, a flat panel display according to the invention that includes a backplate made of a co-fired ceramic substrate can also include either a thermionic cathode or field emission cathode as a source of electrons for the display. If the display includes a thermionic cathode, the feature location tolerance of the substrate may be larger for some thermionic cathode structures, since high density thin film structures are not being formed, as is necessary with field emission cathode displays. Some thermionic cathodes may require precise locations since they may be very small and require precise focusing to work properly. Consequently, ceramic and glass-ceramic materials having a feature tolerance as high as 0.1–0.2% can be used, and appropriate techniques used to accomodate the feature location uncertainty. For example, capture pads which make electrical connection to features on the substrate from off-substrate electrical components can be made large enough so that the capture pad covers all possible locations of the feature, thus ensuring that electrical connection will be made. Or, if the feature unpredictability is manifested as a magnification effect (i.e., uniform shrinkage throughout the substrate), then the substrate and mating components on which the capture pads are formed can be "binned" (i.e., separated according to magnification) and matched together so that parts with approximately the same magnification are assembled together, thereby achieving the desired level of feature predictability. Thus, in these examples, existing ceramic materials, such as alumina ceramic or a magnesium cordierite ceramic can be used in the ceramic substrate.

If the display includes a field emission cathode, then the density of the required thin film structures preclude the use of the above techniques and necessitate that the substrate feature locations be precise. Additionally, the ceramic substrate must have a surface (that, in the display, faces into the sealed enclosure of the display) that is sufficiently flat and smooth, i.e., a surface roughness of 2–6 microinches and a flatness variation of 1–2 mils, to enable thin film deposition on the ceramic substrate surface. A smooth surface is also necessary to prevent burn-outs in the electroluminescent film of TFEL displays.

Polishing or glazing of the surface of the ceramic substrate is often required to achieve an adequately smooth surface. For example, the surface of a ceramic substrate according to the invention can be glazed with a glass coating that is spun-on and fired, filling the pits and voids in the ceramic substrate surface and providing a smooth surface for thin film fabrication. This glass coating can also provide an effective insulator barrier layer if necessary. Such a glass coating is commercially available from Dow Corning. Coatings of 0.5 to 2.5 microns thickness can be applied. The glass coating is patterned and dry etched using a photoresist process to produce bevel edged holes down to the conductive vias. The coated ceramic layer is then fired.

Alternatively, the ceramic can be polished using standard lapidary techniques.

A variety of materials can be used for backplate ceramic substrates according to the invention. In one embodiment, a co-fired ceramic substrate according to the invention is made of alumina ceramic. Tungsten or molybdenum metallization is formed on the surface of layers of multilayer substrates made of alumina. The alumina can be a high temperature co-fired ceramic (HTCC), fired at a temperature typically above 1500° C. Alumina offers excellent electrical properties and good electrical insulation. Alumina substrates can be produced at low cost and with high conductor density on layers of the substrate. Alumina substrates also have high strength.

To reduce stresses associated with differential thermal expansion of the faceplate and backplate, it is important to match the CTEs of the faceplate, side walls and backplate as closely as possible. In one embodiment, the CTE of an alumina ceramic substrate backplate is approximately 69 points (i.e., $69 \times 10^{-7}$ inches/(inch$\times$° C.) for temperatures between 25° C. and 450° C. In this embodiment, the faceplate and side walls are made of a glass having an approximately equal CTE, such as Q10005 from Sem-Com in Toledo, Ohio.

As previously noted, it is important for some displays that one or more surfaces of the backplate be flat and smooth so that metallization can be formed on the backplate surface using thin film deposition. One way to achieve a flat and smooth surface on a co-fired ceramic substrate is to glaze a layer of material on the substrate surface that can be polished to the requisite smoothness in the area in which it is desired to deposit the thin film metal. For an alumina ceramic substrate, the glazing material can be a glass that is a composition such as calcium oxide, aluminum oxide and silicon dioxide. The glass glaze can be chosen so that the glass glaze has a CTE that approximately matches the CTE of the alumina ceramic, is mechanically strong and can be fired at temperatures below 1250° C.

In another embodiment, each of the layers of a multilayer co-fired ceramic substrate according to the invention are made of magnesium cordierite glass ceramic on which copper metallization is formed. Ceramic substrates of this type are available from IBM, e.g. IBM's ES 9000 substrates. In ceramic substrates of this type, good feature accuracy (i.e., tight feature tolerance) can be achieved, i.e.., very tight tolerance (0.1%) on via positions and less than 0.2% xy shrinkage are routinely achieved in high volume production. Further, constrained sintering may be used to achieve even lower feature tolerance. Additionally, the defect (e.g., pores) density is sufficiently low so that good flatness and surface finish are achieved, thus allowing thin film metallization to be applied directly to the ceramic surface.

The fabrication and handling of very thin (less than 15 mils) and large (up to 350 mm in either width or length) multilayer co-fired substrates made of this material has been accomplished; therefore, ceramic substrates made of this material are suitable for use with large flat panel displays. This material is commercially available from the IBM Ceramic Packaging Business Unit of East Fishkill, N.Y.

The coefficient of thermal expansion (CTE) of this material is relatively low (approximately 30 points), and was chosen to be close to that of silicon (approximately 28 points) to provide high reliability of chip bonding to the ceramic. The match of CTE's also allows larger (and, thus, denser) chips to be bonded to the ceramic. Further, it may also be possible to use glasses (e.g., borosilicate glasses such as Pyrex and Kimax) that have a CTE close to CTE of the IBM magnesium cordierite material for the faceplate of the display. Matching of the CTEs of the faceplate and backplate reduces stresses that can otherwise arise as a result of differential thermal expansion of the faceplate and backplate.

The IBM magnesium cordierite material can also be polished to a very high surface finish that meets the finish required for field emitter and EL display fabrication.

As discussed above, one of the limitations of conventional ceramic substrates when used for backplates of large flat panel displays is that shrinkage of the ceramic can result in unacceptably large movement of feature location from the required location. Typically, conventional commercial ceramic layers (such as are available from Coors Electronic Co., Alcoa or Kyocera) can shrink during firing so as to produce an uncertainty regarding the final position of any particular feature on the substrate of 0.5% or more. Further, mechanical punching of via holes and screening of conductive and dielectric thick films on the ceramic layers can result in additional distortion in the ceramic layers, which can further increase the uncertainty of feature locations. Conventional ceramic substrate shrinkage results in, at best, ±0.1% feature uncertainty, inadequate for some flat panel displays. An order of magnitude gain (to a feature location tolerance of ±0.01%) is needed to achieve the required feature location tolerance of approximately 1 mil throughout a 10 inch diagonal ceramic substrate.

In another embodiment, the co-fired ceramic substrate according to the invention is made of a zero shrinkage tolerance (ZST) ceramic available as "ZST Green Tape" from Ragan Technologies, Inc. of San Diego. For multilayer substrates made of ZST ceramic, metallization on the surface of layers of the substrate can be formed of, for example, silver. The ZST ceramic is a filled glass ceramic. Ceramic particles are dispersed in a continuous matrix within a glass having a lower melting point than the ceramic material. The ceramic and glass are fired to a temperature higher than the melting point of the glass and lower than melting point of the ceramic, so that the glass melts, wetting the ceramic particles. When the glass and ceramic are cooled, they solidify, the glass bonding the ceramic particles together. Since the firing temperature is sufficiently low, the matrix of ceramic particles does not change size. The resulting structure is porous, the degree of porosity being controlled by the ratio (both volumetric and density) of glass to ceramic material. The degree of porosity can be controlled to form a closed pore material, if desired or necessary. However, the glass-to-ceramic ratio is kept sufficiently small so that shrinkage of the glass on firing does not become unacceptably large, resulting in shrinking of the ceramic substrate.

As the name implies, ZST ceramic has nearly zero shrinkage tolerance upon firing. In one embodiment, a ZST ceramic for use with the invention has less than 0.5% shrinkage after firing and an 0.01% shrinkage uncertainty (feature location tolerance). Thus, as can be seen, this ZST ceramic achieves the feature location tolerance that is necessary in flat panel displays.

The ZST technique has been demonstrated to allow the fabrication of materials with a wide range of properties. Since the ceramic matrix laced through the glass determines the size and thickness of the ceramic sheet, many different glass binders can be used. The properties of these binders are strong determining factors for the processes and process materials that can be used to make substrates. The glass matrix is chosen to sinter well below the firing range of the filler and to be of such a composition as to minimize reactions between the ceramic and glass phases. Since the firing temperature is low compared to that at which the ceramic filler was originally formed, the ceramic does not change its character to any significant degree during firing. This means that the ceramic and glass phases can be varied independently of one another. There are a very wide range of glass compositions available, and by Judicious choice of glass and ceramic, a very wide range of properties in the fired material can be achieved. For example, the properties of the ceramic can be adjusted in a desired direction by proper choice of the properties of the glass. Materials with varying conductivity, piezoelectric properties, CTE, Strength and toughness can be formed.

The ZST ceramic can be manufactured to have a desired CTE. ZST ceramics have been produced that have CTEs between 54 and 119 points. For example, the CTE of the ZST ceramic can be matched with the CTE of conventional glasses, e.g., float glass which has a CTE of 90 points, used for display faceplates by varying the ratios of the various alumina, glass and other constituents in the ceramic formulation. By matching the CTEs of the backplate and faceplate, stresses at the region of the seal between the backplate and faceplate, that may otherwise arise due to different amounts of expansion and contraction of the backplate and faceplate upon heating and cooling, are reduced or eliminated, resulting in a display with greater structural integrity.

Figure 5:
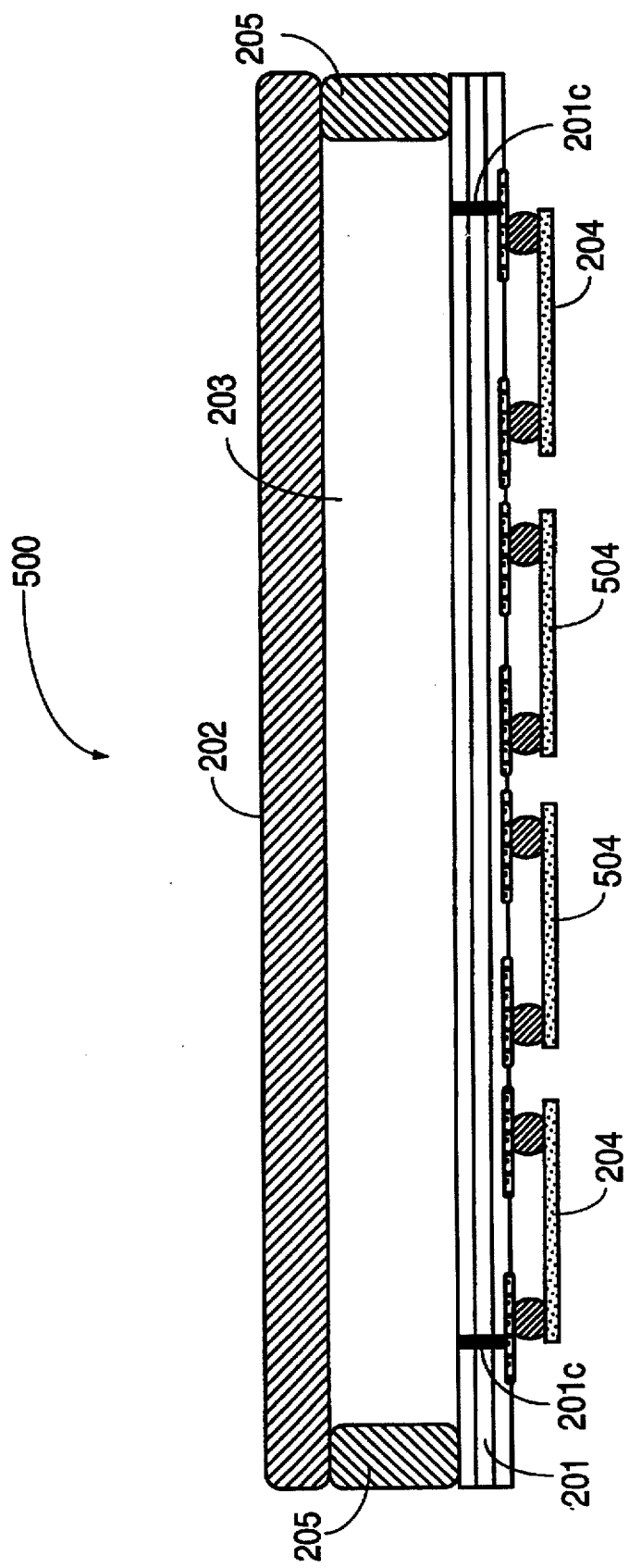
FIG. 5 is a cross-sectional view of a flat panel display according to another embodiment of the invention.

FIG. 5 is a cross-sectional view of flat panel display 500 according to another embodiment of the invention. Flat panel display 500 is similar to flat panel display 250 of FIG. 2E with additional integrated circuit chips 504, other than driver chips 204, attached to surface 251d of backplate 251. Chips 504 can be, for instance, chips on which microprocessor, peripheral (e.g., RAM, clocking, modem) or interface circuitry is formed. Thus, the flat panel device capabilities can be augmented without increasing the size of the device. Chips 504 are attached to surface 251d of backplate 251 in the same manner as the driver chips 204. Mounting of chips 504 to backplate 251 eliminates the need for additional printed circuit boards (PCBs) for mounting chips 504, thus decreasing the thickness of display 500.

Active matrix displays, in which an addressing structure is formed at the location of each display element, have high image quality and are well-suited for use as large flat panel displays. Conventionally, active matrix displays are made by fabricating amorphous or polysilicon thin film transistors (TFTs) directly on the display backplate at each pixel location at the junction of row and column control lines. With such a setup, each pixel stays on for an entire frame time. However, the addition of TFTs at each row/column junction adds to the complexity of the manufacturing process, thereby drastically decreasing the overall production yield of displays made in this manner. If even one of the TFTs is defective, the entire display must be scrapped.

Figure 6:
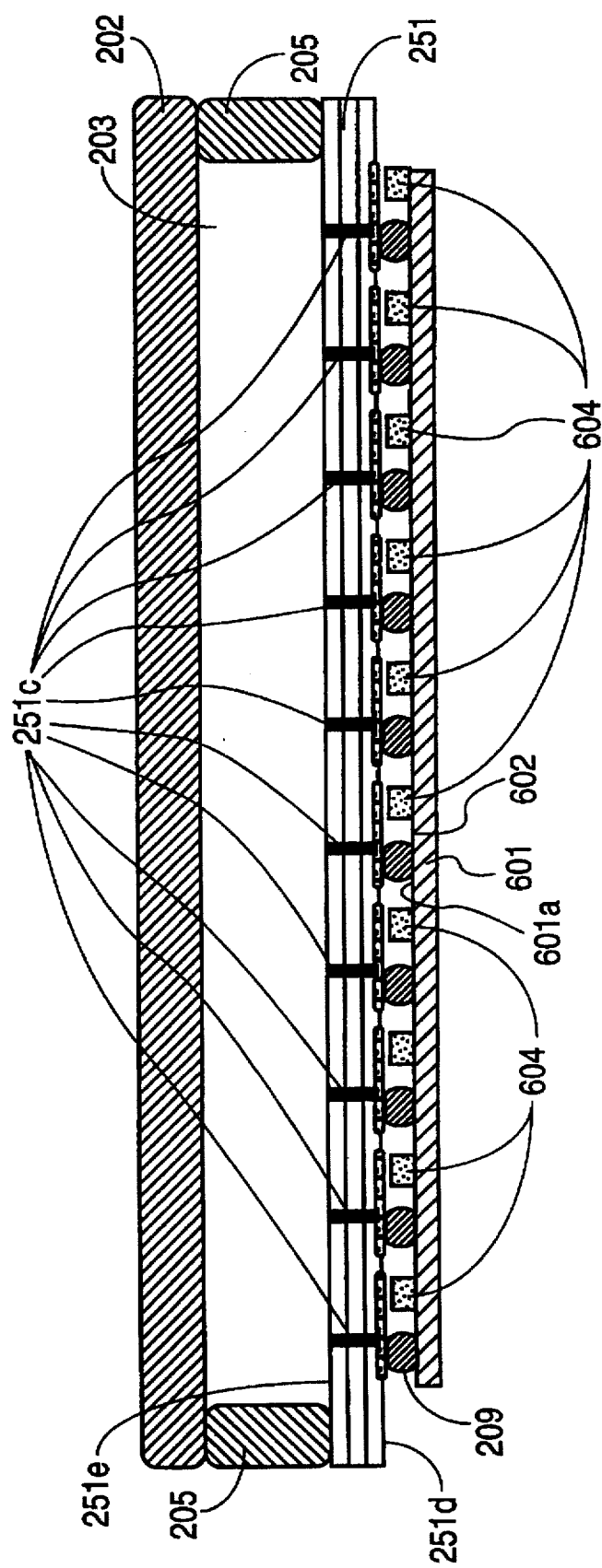
FIG. 6 is a cross-sectional view of a flat panel display including a backplate made of a ceramic and a substrate on which active matrix addressing elements are formed.

FIG. 6 is a cross-sectional view of flat panel display 600 including backplate 251 made of a ceramic substrate and substrate 601 on which active matrix addressing elements 604 are formed. Active matrix addressing elements can be, for example, thin film transistors formed in surface 601a of substrate 600. Flat panel display 600 is similar to flat panel display 250 of FIG. 2E, and like elements are labelled with the same numerals. In flat panel display 600, rather than fabricating active matrix addressing elements 604 on backplate 251 as in previous active matrix displays, active matrix addressing elements 604 are fabricated on substrate 601. Substrate 601 is attached to surface 251d of backplate 251 by solder bumps 209. Active matrix addressing elements 604 are electrically connected to individual display elements (not shown) within enclosure 203 by metallization, e.g., trace 602, formed on surface 601a of substrate 601, solder bumps 209, traces 251f formed on surface 251d of backplate 251 and vias 251c.

Substrate 601 can be produced independently of the remainder of display 600. Thus, active matrix addressing elements 604 on substrate 601 can be tested before attachment of substrate 601 to backplate 251, enabling defective substrates 601 to be scrapped without need to scrap the entire display 600.

Figure 7:
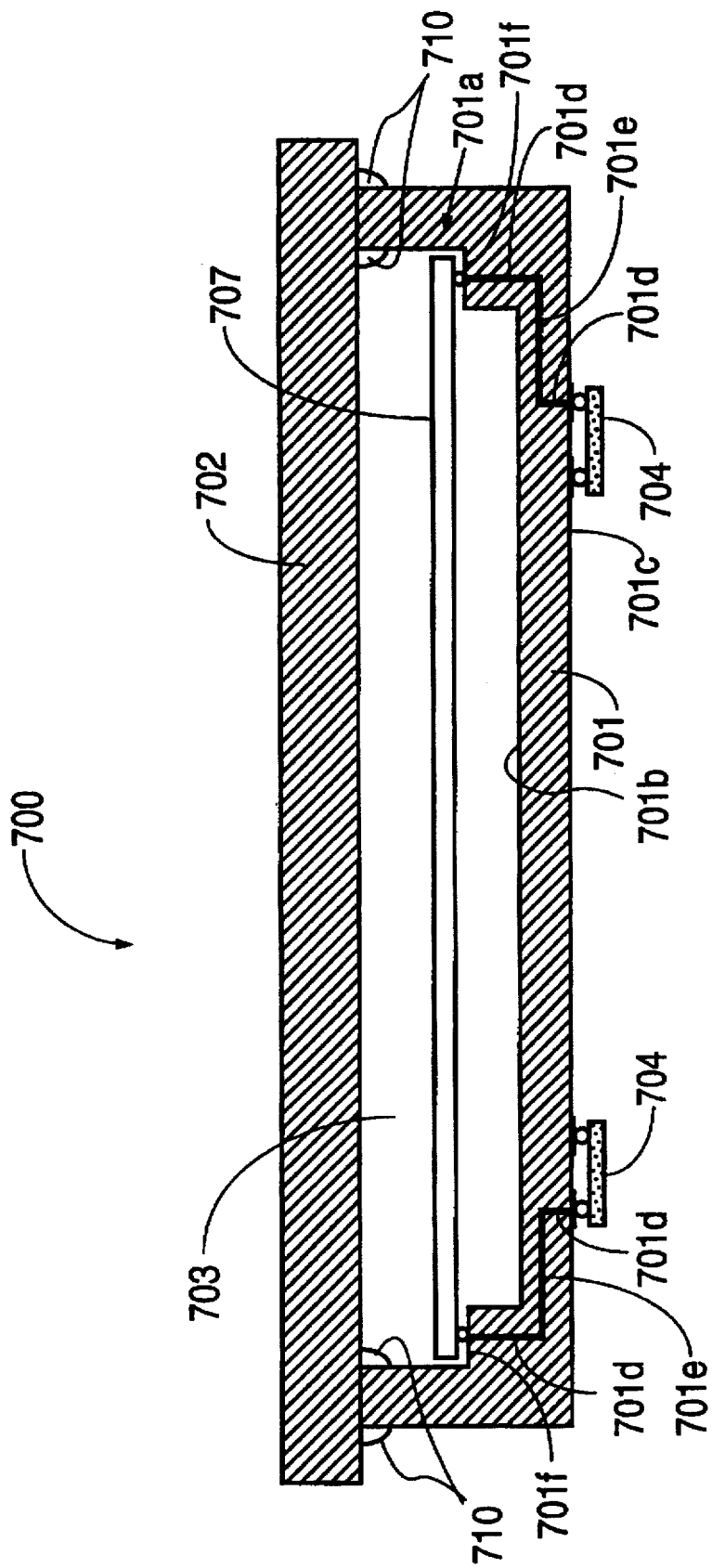
FIG. 7 is a cross-sectional view of a flat panel display according to another embodiment of the invention.

FIG. 7 is a cross-sectional view of a flat CRT display 700 according to another embodiment of the invention. Flat CRT display 700 includes faceplate 702, backplate 701 and addressing grid 707. Faceplate 702 and backplate 701 form a sealed enclosure 703. Emissive elements (not shown) are formed on interior surface 701b of backplate 701. The emissive elements can be a thermionic or field emission cathode. One or more emissive elements correspond to each of a plurality of pixel locations on faceplate 702. A flow of electrons is emitted from the emissive elements toward the phosphor coated interior surface of faceplate 702. Addressing grid 707 is used to control the flow of electrons from the emissive elements so that only desired pixels are lighted on faceplate 702. Addressing grid 707 can also be used to, for instance, focus the flow of electrons. Use of an addressing grid such as addressing grid 707 is described in more detail in commonly owned, co-pending U.S. patent application Ser. No. 08/012,297, filed Feb. 1, 1993, entitled "Grid Addressed Field Emission Cathode," now U.S. Pat. No. 5,541,473.

Integrated circuit chips 704 on which driver circuitry is formed are attached to exterior surface 701c of backplate 701 using, for instance, the C4 or TAB interconnection techniques. Bond pads on integrated circuit chips 704 are electrically connected to bonding locations on exterior surface 701c. Electrically conductive vias 701d and electrically conductive traces 701e formed within backplate 701 electrically connect the bonding locations on exterior surface 701c to bonding locations formed on interior surface 701f that is substantially parallel to, but not coplanar with, interior surface 701b. Bonding locations on addressing grid 707 are electrically connected to the bonding locations on interior surface 701f by, for instance, brazing or conductive frit. Therefore, the driver circuitry on integrated circuit chips 704 is electrically connected to the addressing grid 707 so that the driver circuitry can be used to control the addressing grid 707, as discussed above.

Though not shown in FIG. 7, spacers can be used to support faceplate 702 against grid 707, and to support grid 707 against backplate 701, in a manner similar to that described above with respect to FIGS. 2A and 2B.

Backplate 701 is a co-fired ceramic Substrate that can be formed with any of the materials and processes described above. In order to create the step Change between interior surfaces 701b and 701f, a rectangular hole is formed, by for instance, stamping, in one or more of the ceramic layers of the backplate 701 before the ceramic layers are laminated together. The wall portions 701a of backplate 701 can be formed from ceramic layers in the same manner (i.e., stamping an appropriately sized hole in the ceramic layers before lamination) and laminated and fired together with the remainder of backplate 701 to form an integral structure. The wall portions 701a are attached to faceplate 702 with frit glass 710 to form sealed enclosure 703. Alternatively, the wall portions 701a can be formed separately from backplate 701 (as in FIGS. 2A and 2B above) and attached to both faceplate 702 and backplate 701 with, for example, frit glass.

Importantly, addressing grid 707 does not extend outside of sealed enclosure 703. Thus, sealing the enclosure 703 is simplified since there is no need to provide a seal at points where addressing grid 707 would leave the enclosure 703. Further, addressing grid 707 itself does not have to be an airtight structure, a characteristic that would otherwise be necessary to maintain the seal of enclosure 703 if addressing grid 707 extended outside of enclosure 703. Additionally, addressing grid 707 can be thinner than would otherwise be necessary if addressing grid 707 extended outside of enclosure 703 since addressing grid 707 need not be strong enough to withstand inadvertent impacts. It is desirable to make the addressing grid 707 thinner because it is easier to get electrons through the addressing grid 707.

Figure 8:
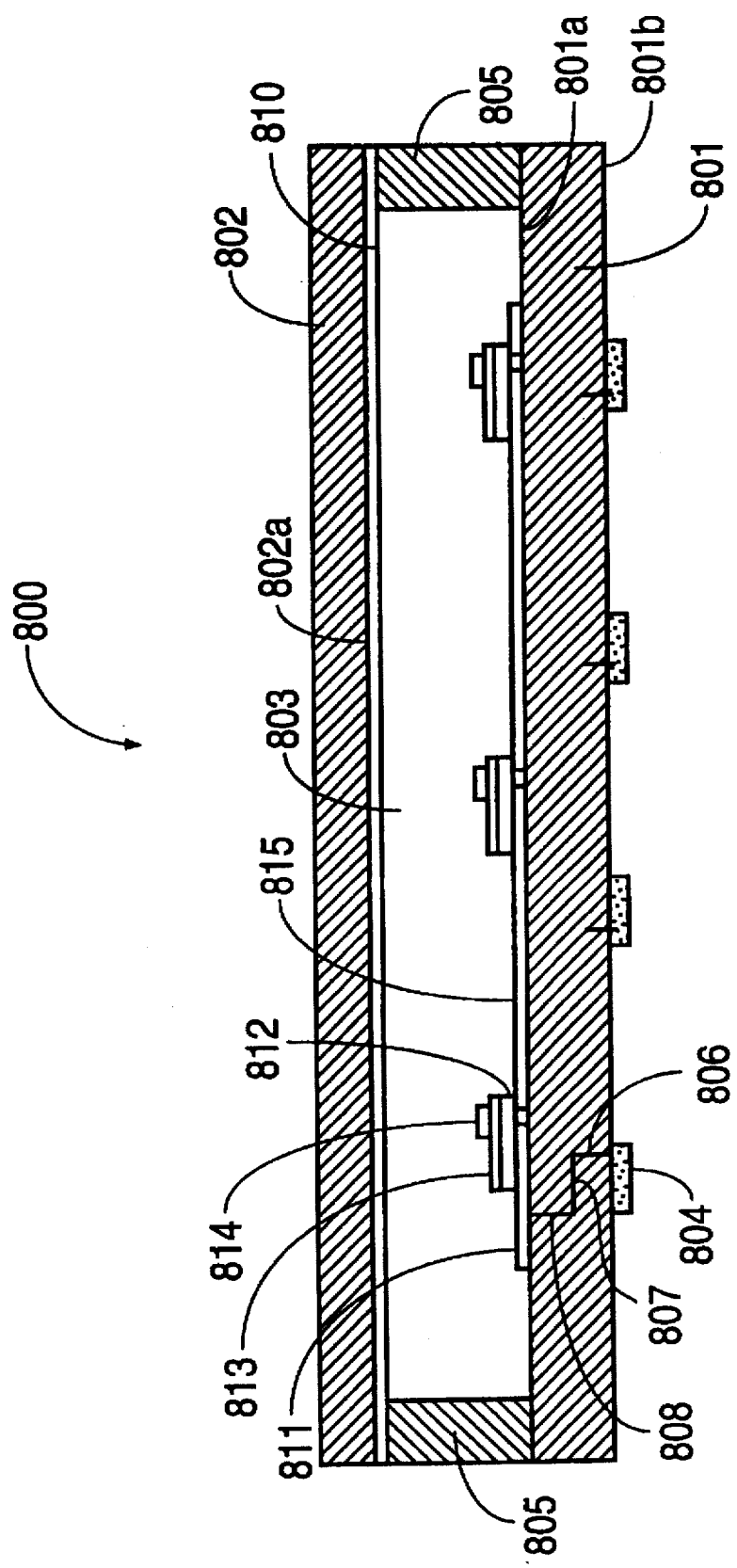
FIG. 8 is a cross-sectional view of a flat reflective LCD according to another embodiment of the invention.

FIG. 8 is a cross-sectional view of flat reflective LCD 800 according to another embodiment of the invention. Faceplate 802 (typically made of glass), transparent electrode 810 (described further below), side walls 805 (made of, for instance, a hardened epoxy), and backplate 801 (made of a co-fired ceramic) form a sealed enclosure 803. Enclosure 803 is filled with a scattering type of liquid crystal material such as a polymer dispersed liquid crystal. Transparent electrode 810 is made of indium tin oxide (ITO) and is formed by, for example, sputtering on interior surface 802a of faceplate 802. Row electrodes, e.g., row electrode 811, are made of a reflective metal such as aluminum or chromium and are formed by, for example, evaporation or sputtering, on interior surface 801a of backplate 801. Between the row electrodes, large area electrodes 815 are formed from the same reflective metal, which will be switched by the TFT's to apply voltage to the LCD material to cause light modulation. Insulating pads, e.g., insulating pad 812, are made of, for example, silicon dioxide or silicon nitride and are formed by, for example, chemical vapor deposition on row electrodes, e.g., row electrode 811. Thin film transistors, e.g., thin film transistor 813, are made of, for example, amorphous silicon and are formed by, for example, chemical vapor deposition on insulating pads, e.g., insulating pads 812. Column electrodes, e.g., column electrodes 814, are made of a metal such as aluminum or nichrome and are formed perpendicularly to the row electrodes, e.g., row electrode 811, by, for example, evaporation or sputtering so that column electrodes, e.g., column electrode 814, cover thin film transistors, e.g., thin film transistor 813. Each combination of a row and column electrode and switched electrode, e.g., row and column electrode 811 and 814 and switched electrode 815, corresponds to a pixel of display 800.

Integrated circuit chips, e.g., integrated circuit chip 804, are attached to exterior surface 801b of backplate 801. At least some of the integrated circuit chips are driver chips that are used to address the row electrodes, e.g., row electrode 811. The integrated circuit chips are attached to backplate 801 by, for example, C4 bonding. The integrated circuit chips, e.g., integrated circuit chip 804, are electrically connected to the row electrodes, e.g., row electrode 811 by electrically conductive vias, e.g., vias 806 and 808, and electrically conductive traces, e.g., trace 807, formed in backplate 801. A voltage is applied to the row and column electrodes, e.g., row and column electrodes 811 and 814, by the driver chips and thin film transistors, e.g., thin film transistor 813, switch electrode 815 to apply voltage to the liquid crystal. Light is reflected from regions of the display depending on the voltage applied to the row and column electrodes, e.g., row and column electrodes 811 and 814, at any given pixel.

Figure 9A:
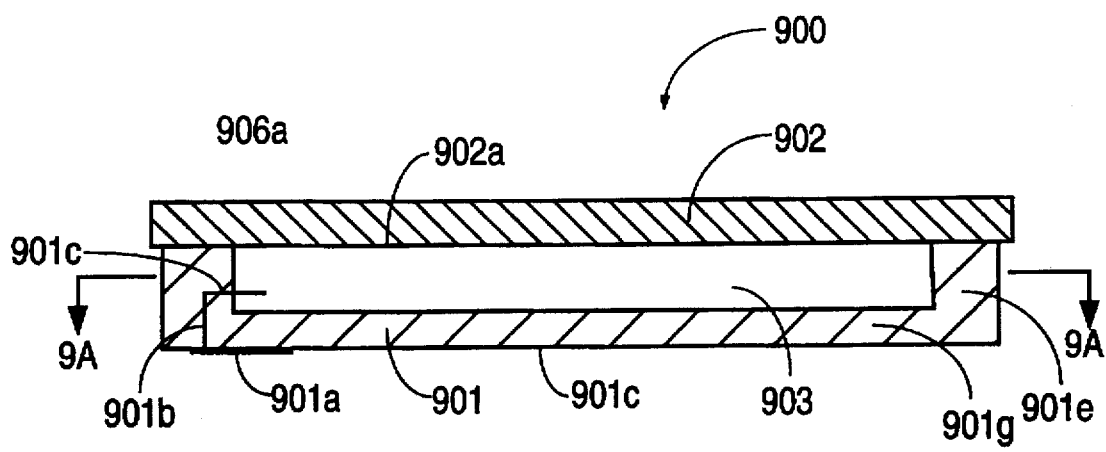
FIG. 9A is a side cross-sectional view, in the direction of section 9B—9B of FIG. 9B, of a flat LCD backlight according to another embodiment of the invention.
Figure 9B:
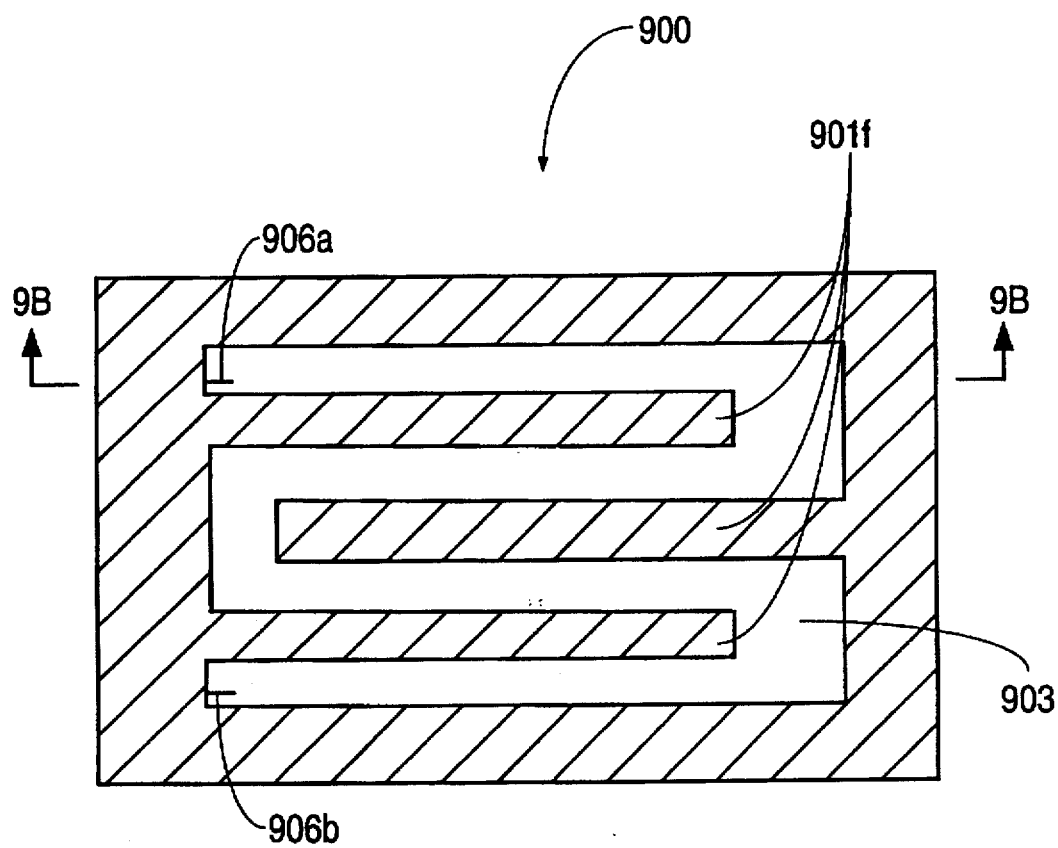
FIG. 9B is a plan cross-sectional view, in the direction of section 9A—9A of FIG. 9A, of the flat LCD backlight of FIG. 9A.

FIG. 9A is a side cross-sectional view, in the direction of section 9B-9B of FIG. 9B, of flat LCD backlight 900 according to another embodiment of the invention. FIG. 9B is a plan cross-sectional view, in the direction of section 9A—9A of FIG. 9A, of flat LCD backlight 900. Faceplate 902 and backplate 901 form a sealed enclosure 903 that is held at a vacuum pressure that is conventional for fluorescent tubes. A gas such as helium or neon is within enclosure 903. Cathodes 906a and 906b are formed of a metal such as nickel and extend through backplate 902 into enclosure 901. Each of cathodes 906a and 906b are electrically connected to a connection pad, e.g., connection pad 901a, formed on exterior surface 901d of backplate 901 by electrically conductive trace(s), e.g., trace 901c, and electrically conductive via(s), e.g., via 901b. Voltage sources (not shown) are electrically connected to the connections pads so that a voltage can be applied to cathodes 906a and 906b. An AC voltage is applied to each of cathodes 906a and 906b. Illustratively, the potential difference between cathodes 906a and 906b is approximately 1000 volts. The cathode voltages excite the gas within enclosure 903 causing ultraviolet light to be created and directed toward the interior surface 902a of faceplate 902. When the ultraviolet light strikes phosphor coated on surface 902a, the phosphor emits light. Unlike previous LCD backlights, in which the voltage sources are mounted on a portion of the backplate which extends beyond the backlight side walls, the voltage sources in LCD backlight 900 can be mounted to exterior surface 901d of backplate 901, thus allowing LCD backlight 900 to be made smaller than previous backlights.

Backplate 901 is a co-fired ceramic substrate that can be formed with any of the materials and processes described above. In order to create the serpentine path of enclosure 903, a hole having the desired shape is formed in one or more of the ceramic layers of the backplate 901, by, for instance, stamping with a patterned die, before the ceramic layers are laminated together. Alternatively, wall portions 901e and 901f of backplate 901 can be formed separately and attached to base portion 901g of backplate 901 with a suitable adhesive.

Figure 10:
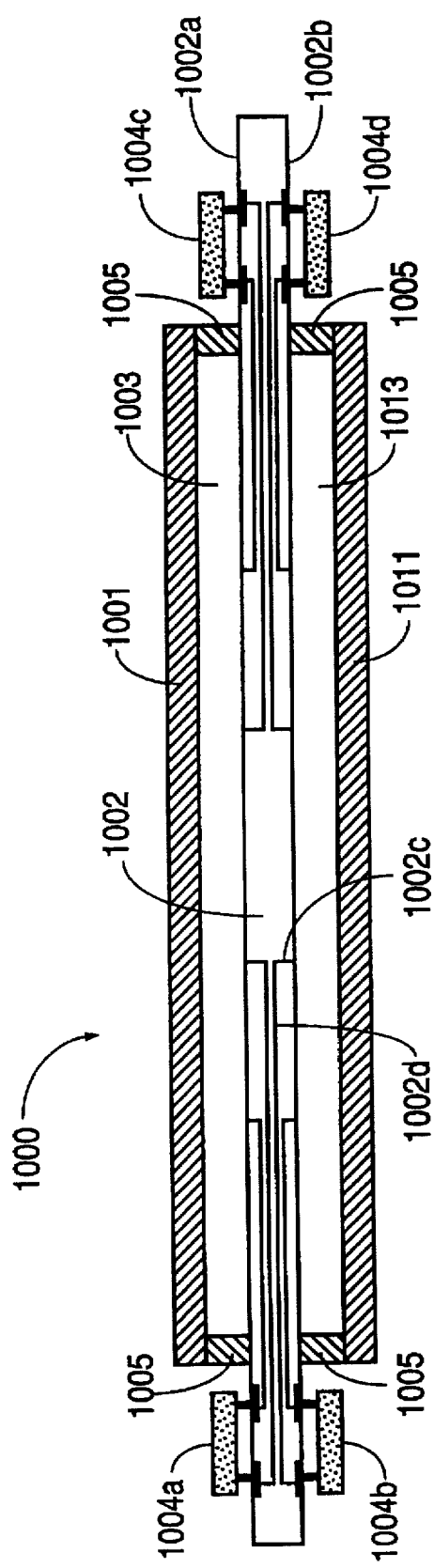
FIG. 10 is a cross-sectional view of a two-sided flat panel display according to the invention.

FIG. 10 is a cross-sectional view of two-sided flat panel display 1000 according to the invention. Flat panel display 1000 has two faceplates 1001 and 1011. Ceramic substrate 1002 is disposed between faceplates 1001 and 1011. Side walls 1005, faceplates 1001 and 1011, and substrate 1002 are attached to each other with, for example, a frit glass to form sealed enclosures 1003 and 1013. Though not shown, if necessary, spacers are formed between faceplate 1001 and substrate 1002, and between faceplate 1011 and substrate 1002.

Separate light producing structures can be provided on either side of substrate 1002, e.g., thermionic or field emission cathodes, within enclosures 1003 or 1013. Each of the light producing structures is addressed by one of driver chips 1004a, 1004b, 1004c or 1004d. The driver chips, e.g., driver chip 1004b, are electrically connected to the light producing structures within the enclosures, e.g., enclosure 1013, by electrically conductive vias, e.g., via 1002c, formed in and electrically conductive traces, e.g., trace 1002d formed in or on substrate 1002, in a manner similar to those described in the above embodiments.

Figure 11:
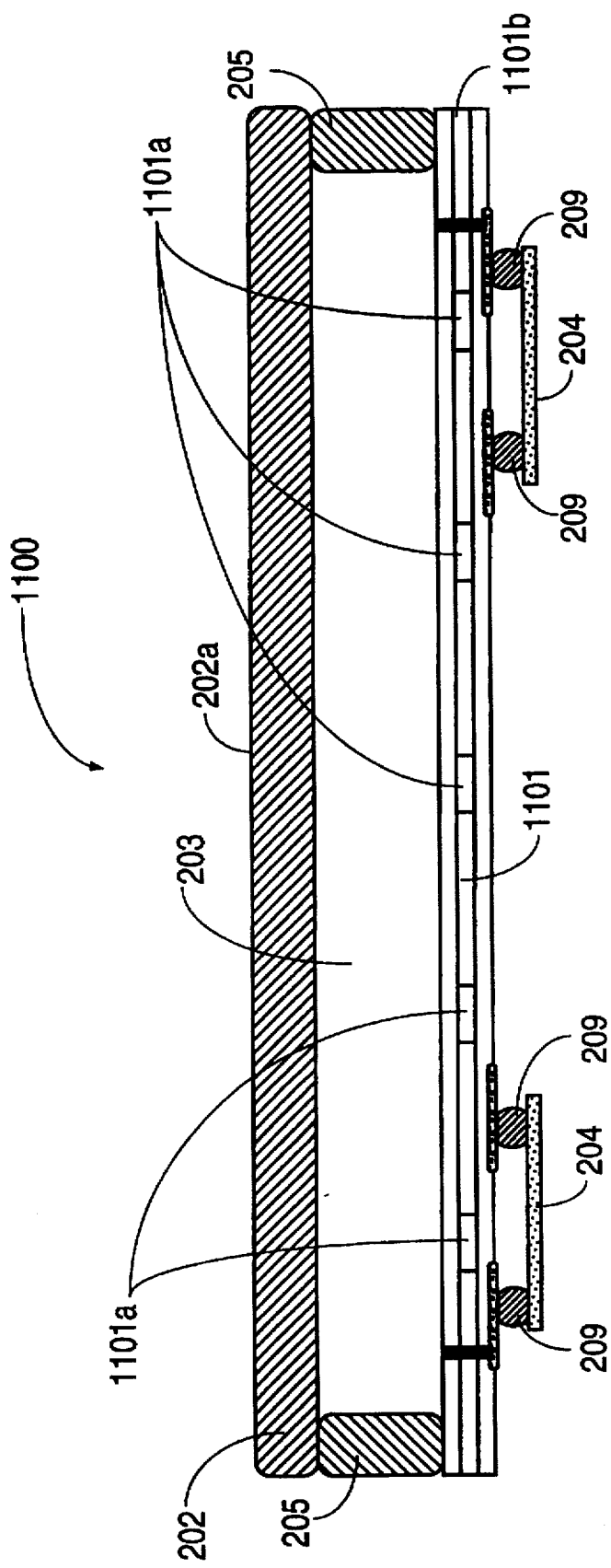
FIG. 11 is a cross-sectional view of flat panel display including a backplate in which channels are formed to allow cooling fluid to pass within the backplate.

In some flat panel devices according to the invention, excessive heat build-up may be of great concern. A ceramic substrate according to the invention that has multiple layers can be formed with channels within the substrate that allow for passage of a fluid (e.g., air) through the backplate to aid in the removal of heat from the flat panel device. FIG. 11 is a cross-sectional view of flat panel display 1100 including backplate 1101 in which channels 1101a are formed to allow cooling fluid to pass within backplate 1101. Channels 1101a can be formed by stamping or other appropriate method in interior layer 1101b of backplate 1101 during the formation of backplate 1101 as a multilayer ceramic substrate. It is to be understood that any number of channels can be formed in any desired pattern through any number of layers of a multilayer ceramic substrate to form a backplate similar to backplate 1101 that provides a means for cooling the backplate.

In the above embodiments of flat panel displays according to the invention, the faceplate, backplate and addressing grid (if present) have been planar. According to the invention, the backplate, faceplate and addressing grid can also be made curved—either concave or convex—if desired.

Figure 12:
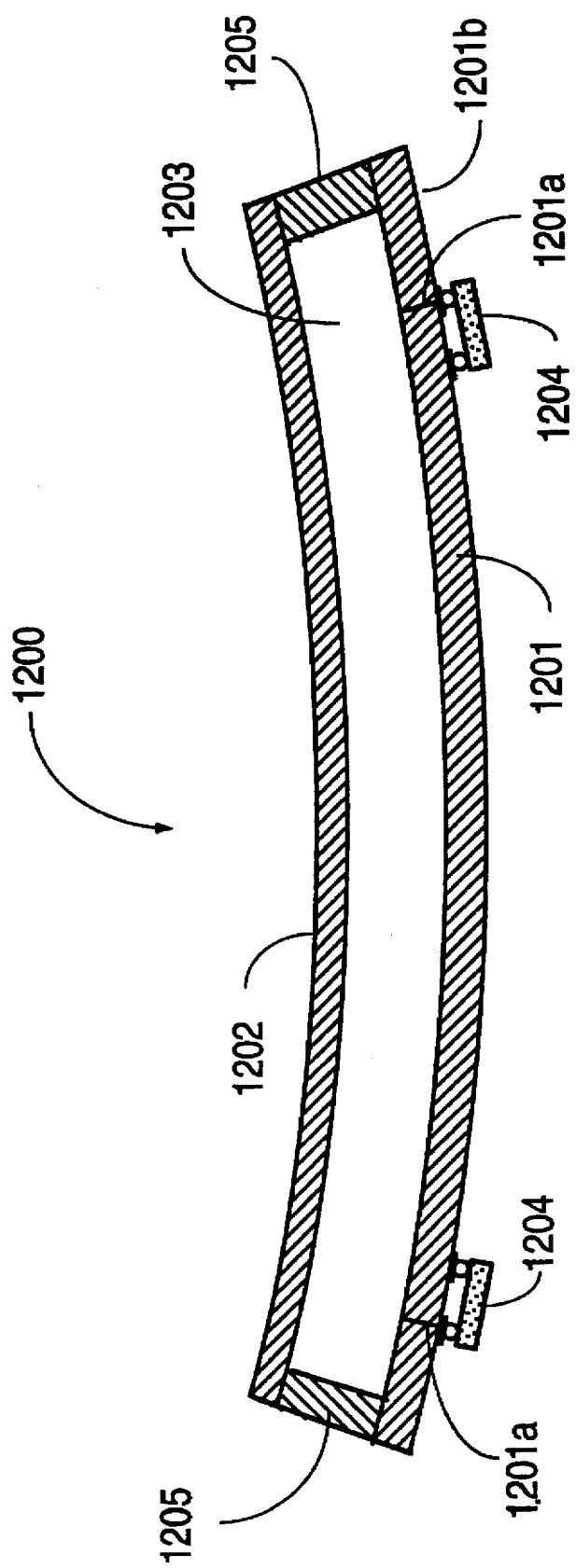
FIG. 12 is a simplified cross-sectional view of a flat panel display according to another embodiment of the invention in which the faceplate and backplate are curved but thin.

FIG. 12 is a simplified cross-sectional view of flat panel display 1200 according to another embodiment of the invention in which faceplate 1202 and backplate 1201 are curved. With side walls 1205, faceplate 1202 and backplate 1201 form sealed enclosure 1203. Driver chips 1204 are attached as described above to exterior surface 1201b of backplate 1201. Other than the curvature of faceplate 1202 and backplate 1201, flat panel display 1200 is constructed and operates in the same manner as described above for other similar flat panel displays such as flat panel display 200 of FIG. 2A.

Generally, for displays in which a curved faceplate and backplate are necessary (such as simulators or virtual reality displays) the curvature of the display will be sufficiently large so that the curvature is not an impediment to mounting integrated circuit chips, e.g., driver chips, using mounting techniques such as solder post or C4. If the radius of curvature of the flat panel display is small enough such that the mounting of integrated circuit chips cannot be done using conventional mounting techniques, then the backplate can be formed with flat areas where the chip will be mounted. Such a backplate can be formed by molding the backplate with flat areas or grinding flat areas into an existing backplate. The flat areas are formed after the ceramic is fired, but before any via plating. Additionally, if the chips are not mounted onto the back of the backplate, but, rather, around the periphery of the display, the periphery can be formed with flat areas for chip mounting.

Where thin film transistors are formed on the backplate for use as drivers (or otherwise), the curvature of the backplate becomes an issue only insofar as lithography would need to be carried out on the curved surface of the backplate, something which is currently done in traditional CRT phosphor manufacturing.

The above-described ceramic substrates enable fabrication of a backplate for a flat panel device that is superior to previously used glass backplates in terms of performance (i.e., high processing temperature capability, ability to mount driver chips to an exterior surface of the backplate), reliability and cost. This ceramic advantage is expected to increase as materials and automation techniques are developed to support the implementation of larger displays.

The present invention is not limited to the embodiments described in detail above. The ceramic substrate and other features of the invention can be used in many flat displays and other technologies such as integrated circuit multichip modules. Thus, while the invention has been described with respect to a ceramic substrate for a flat CRT display, the invention applies generally to any flat panel device in which a ceramic substrate can be Used to reduce size, improve strength, improve reliability and decrease per unit cost. The scope of the invention is limited solely by the claims below.

We claim:

1. A method which comprises the following steps for manufacturing a flat panel device:
   combining a plurality of layers, including a ceramic first layer, to form a laminated structure, the ceramic comprising zero shrinkage tolerance ceramic;
   firing the laminated structure to convert the layers into an integral backplate substrate, at least part of which constitutes a backplate; and
   fabricating a flat panel structure that comprises (a) the backplate, (b) a faceplate connected to the backplate to form a sealed enclosure, (c) means for producing light, and (d) means for controlling the light-producing means.

2. A method as in claim 1 wherein the fabricating step entails connecting the faceplate to the backplate in an assembly environment maintained at a pressure below standard atmospheric pressure so that the enclosure is maintained at a pressure below standard atmospheric pressure upon removal of the flat panel device from the assembly environment.

3. A method as in claim 2 wherein the pressure in the assembly environment during the connecting step is substantially at vacuum level compared to standard atmospheric pressure.

4. A method as in claim 1 wherein the layers of the laminated structure include a ceramic second layer.

5. A method as in claim 1 further including the steps of:
   forming vias through at least one of the layers; and
   filling the vias with electrically conductive material to form conductive vias.

6. A method as in claim 5 wherein the fabricating step entails electrically connecting the controlling means to the light-producing means through the conductive vias.

7. A method as in claim 1 wherein the combining step entails combining the layers so as to include at least one internal layer of electrically conductive traces.

8. A method as in claim 7 wherein the fabricating step entails electrically connecting the controlling means to the light-producing means through the traces.

9. A method as in claim 1 further including the step of glazing the backplate substrate.

10. A method as in claim 9 wherein the glazing step comprises:
    applying glazing material across the backplate substrate; and
    heating the glazing material to a glazing temperature sufficiently high to fuse the glazing material over the backplate substrate.

11. A method as in claim 10 wherein the glazing step acts to smoothen the backplate substrate.

12. A method as in claim 11 wherein the glazing material comprises glass.

13. A method as claim 1 wherein the fabricating step includes:
    applying sealing material to the backplate over a substantially annular area where the backplate is to be connected to the faceplate;
    pre-glazing the sealing material; and
    subsequently connecting the backplate to the faceplate.

14. A method as in claim 13 wherein the pre-glazing step entails raising the sealing material to a temperature of at least 400° C.

15. A method as in claim 1 further including the step of selectively depositing metal on metallization provided on the backplate or the backplate substrate.

16. A method as in claim 15 wherein the depositing step comprises electroplating the metal.

17. A method as in claim 1 wherein the light-producing means comprises:
    cathode means for emitting electrons; and
    light-emitting means for emitting light upon being struck by electrons emitted from the cathode means.

18. A method as in claim 17 wherein the cathode means comprises a field emitter cathode.

19. A method as in claim 1 further including the step of cutting the backplate substrate into sections, one of which substantially constitutes the backplate.

20. A method as in claim 1 wherein the fabricating step entails connecting the faceplate to the backplate through outer walls.

21. A method which comprises the following steps for manufacturing a flat panel device:
    combining a plurality of layers, including a ceramic first layer, to form a laminated structure;
    firing the laminated structure to convert the layers into an integral backplate substrate, at least part of which constitutes a backplate;
    applying glazing material across the backplate;
    heating the glazing material to a glazing temperature sufficiently high to fuse the glazing material over the backplate; and
    fabricating a flat panel structure that comprises the backplate, (b) a faceplate connected to the backplate to form a sealed enclosure, (c) a field emitter cathode for emitting electrons, (d) light-emitting means for emitting light upon being struck by electrons emitted from the field emitter cathode, and (e) means for controlling the field emitter cathode.

22. A method as in claim 21 wherein the backplate substrate is smoothened during the heating step.

23. A method which comprises the following steps for manufacturing a flat panel device:
    combining a plurality of layers, including a ceramic first layer, to form a laminated structure;
    firing the laminated structure to convert the layers into an integral backplate substrate; at least part of which constitutes a backplate;

providing the backplate with cooling channels suitable for transporting cooling fluid; and fabricating a flat panel structure that comprises the backplate, (b) a faceplate connected to the backplate to form a sealed enclosure, (c) means for producing light, and (d) means for controlling the light-producing means.

24. A method which comprises the following steps for manufacturing a flat panel device:

combining a plurality of layers, including a ceramic first layer, to form a laminated structure;

firing the laminated structure to convert the layers into an integral backplate substrate, at least part of which constitutes a backplate;

forming openings in the backplate;

creating a field emitter cathode which occupies the openings in the backplate;

furnishing means for controlling the field emitter cathode;

providing a faceplate, including light-emitting means situated along the faceplate for emitting light upon being struck by electrons; and connecting the faceplate to the backplate to form a sealed enclosure.

25. A method as in claim 24 wherein the layers of the laminated structure include a ceramic second layer.

26. A method as in claim 24 wherein the layers of the laminated structure include a patterned electrically conductive layer adjacent to the ceramic first layer.

27. A method as in claim 26 wherein the furnishing step entails electrically connecting the field emitter cathode to the controlling means through the conductive layer.

28. A method as in claim 1 wherein the zero shrinkage tolerance ceramic shrinks no more than 0.5% in volume during the firing step.

29. A method as in claim 28 wherein the zero shrinkage tolerance ceramic has a firing shrinkage tolerance whose maximum magnitude is approximately 0.01%.

30. A method as in claim 24 wherein the openings in the backplate extend fully through the backplate, the creating step entailing filling the openings with electrically conductive material.

31. A method as in claim 30 wherein the conductive material in the openings comprises whiskers of electrically conductive material.

* * * * *